(12) United States Patent
Podkaminer et al.

(10) Patent No.: US 12,410,303 B2
(45) Date of Patent: Sep. 9, 2025

(54) THERMAL FILLER PARTICLE, THERMALLY CONDUCTIVE COMPOSITION, AND ASSEMBLY INCLUDING THE SAME

(71) Applicant: 3M INNOVATIVE PROPERTIES COMPANY, St. Paul, MN (US)

(72) Inventors: Jacob P. Podkaminer, St. Paul, MN (US); Matthew H. Frey, Cottage Grove, MN (US); Victor Ho, St. Paul, MN (US); Matthew T. Johnson, Woodbury, MN (US); Jeremy K. Larsen, Farmington, MN (US); Craig W. Lindsay, Arden Hills, MN (US); Kyle C. Picha, Maplewood, MN (US); Mario A. Perez, Burnsville, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 153 days.

(21) Appl. No.: 18/014,783

(22) PCT Filed: Jul. 22, 2021

(86) PCT No.: PCT/IB2021/056644
§ 371 (c)(1),
(2) Date: Jan. 6, 2023

(87) PCT Pub. No.: WO2022/023900
PCT Pub. Date: Feb. 3, 2022

(65) Prior Publication Data
US 2024/0239991 A1 Jul. 18, 2024

Related U.S. Application Data

(60) Provisional application No. 63/057,655, filed on Jul. 28, 2020.

(51) Int. Cl.
*C08K 7/00* (2006.01)
*C08L 33/02* (2006.01)
*C09K 5/14* (2006.01)

(52) U.S. Cl.
CPC .................. *C08K 7/00* (2013.01); *C09K 5/14* (2013.01); *C08K 2201/001* (2013.01); *C08L 33/02* (2013.01)

(58) Field of Classification Search
CPC ................ C08K 7/00–28; C08K 13/04; C01P 2004/00–90
See application file for complete search history.

(56) References Cited

U.S. PATENT DOCUMENTS 5,714,259 A 2/1998 Holmes et al.
6,681,487 B2 1/2004 Sagal et al.
(Continued)

FOREIGN PATENT DOCUMENTS

CN 2921526 Y 7/2007
CN 104513487 A 4/2015
(Continued)

OTHER PUBLICATIONS

Hampton, "The Patterning of Sub-500 nm Inorganic Oxide Structures", Advanced Materials, 2008, vol. 20, No. 14, pp. 2667-2673.
(Continued)

*Primary Examiner* — Alexandre F Ferre
(74) *Attorney, Agent, or Firm* — Bradford B. Wright

(57) ABSTRACT

A shaped thermal filler particle has an elongate shape defined by a substantially planar first smooth surface and a second smooth surface that contacts the substantially planar first smooth surface along a planar closed path. The planar closed path has a length to width ratio of at least 1.5. The shaped thermal filler particle has a maximum linear dimension normal to the planar first smooth surface that is less than
(Continued)

or equal to one half of the length of the closed path. A thermally conductive composition comprises from 1 to 95 percent by volume of the shaped thermal filler particles dispersed in a binder. An assembly comprises a heat source, a heat sink, and the thermally conductive composition at least partially sandwiched between the heat source and the heat sink.

16 Claims, 16 Drawing Sheets

(56) References Cited

U.S. PATENT DOCUMENTS

| | | | |
|---|---|---|---|
| 6,981,805 B2 | 1/2006 | Miller et al. | |
| 8,142,891 B2 | 3/2012 | Culler et al. | |
| 8,701,441 B2 | 4/2014 | Kramlich et al. | |
| 10,000,677 B2 | 6/2018 | Boden et al. | |
| 10,315,289 B2 | 6/2019 | Kasai et al. | |
| 2003/0222249 A1* | 12/2003 | Bunyan | H01L 23/3737 257/E23.114 |
| 2009/0099537 A1 | 4/2009 | Devoe et al. | |
| 2017/0036303 A1* | 2/2017 | Oribe | B23K 26/38 |
| 2018/0215975 A1 | 8/2018 | Marazano et al. | |
| 2020/0407618 A1* | 12/2020 | Sawamura | H01L 23/373 |
| 2022/0056240 A1* | 2/2022 | Crookes | C08J 3/201 |

FOREIGN PATENT DOCUMENTS

| | | |
|---|---|---|
| CN | 105255163 A | 1/2016 |
| CN | 107603224 A | 1/2018 |
| CN | 108250747 A | 7/2018 |
| CN | 108546414 A | 9/2018 |
| CN | 106278199 B | 2/2019 |
| CN | 109574649 A | 4/2019 |
| JP | 5274007 B2 | 8/2013 |
| WO | 2011007639 A1 | 1/2011 |
| WO | 2016007287 A1 | 1/2016 |
| WO | 2017155687 A1 | 9/2017 |
| WO | 2017155779 A1 | 9/2017 |
| WO | 2018134721 A1 | 7/2018 |
| WO | 2019069157 A1 | 4/2019 |
| WO | 2020229962 A1 | 11/2020 |

OTHER PUBLICATIONS

International Search Report received for PCT International Application No. PCT/IB2021/056644, mailed on Oct. 22, 2021, 5 pages.
Nunes, "Hierarchical Control of Polymer Composite Nano- and Micro-Structure with Lithography", 2010, Chemistry of Materials, vol. 22, No. 13, pp. 4069-4075.
Rolland, "Direct Fabrication and Harvesting of Monodisperse, Shape-Specific Nanobiomaterials", 2005, Journal of the American Chemical Society (JACS), vol. 127, No. 28, pp. 10096-10100.

* cited by examiner

THERMAL FILLER PARTICLE, THERMALLY CONDUCTIVE COMPOSITION, AND ASSEMBLY INCLUDING THE SAME

TECHNICAL FIELD

The present disclosure broadly relates to materials for thermal management and assemblies including them.

BACKGROUND

Composite thermal interface materials (TIMs) serve as pathways for the transport of thermal energy away from devices that generate heat. TIMs are used to aid in the transport of thermal energy away from devices that need to be maintained below temperatures that may hinder their performance or lifetime. Examples of such devices include batteries (e.g., lithium ion batteries), electric machines (e.g., motors, generators), and semiconductor electronics (e.g., inverters, processors).

TIMs often take the form of composite materials comprising an organic matrix (e.g., an organic polymer) and thermal filler particles (e.g., particles of ceramic, carbon, or metal). The matrix usually imparts important mechanical features (e.g., compliance, softness, toughness) or interfacial features (e.g., wet-out, adhesion) to the composite. Thermal filler particles serve to boost thermal conductivity of the composite, and may also provide such features as flame retardancy, endothermic transitions, or color. Certain thermal fillers may also serve to reduce the density of a composite (known in the art as 20 "lightweighting").

In order to achieve high thermal conductivity for polymer-matrix composites, particulate thermal fillers are generally included at high volume percent (as alternatively expressed herein as volume fraction) loading (e.g., greater than 50 volume percent). Such high loading levels often degrade other properties of the TIM composite (e.g., elongation-at-break, compliance) or the processability of the TIM composite. The processing of TIM composites often includes a step before curing where a flowable dispersion of the thermal filler particles in binder precursor must be transported by flow (e.g., pumped, dispensed, extruded, coated, squeezed), placing demands on the rheological properties of that fluid dispersion. The design of improved TIM composites, including the design of particulate fillers, is chronically challenged by the tradeoff between thermal conductivity and the aforementioned mechanical or rheological properties.

SUMMARY

There is a need in the thermal management art for improved thermal filler particles that can better balance thermal conductivity in TIMs and the foregoing rheological properties.

In a first aspect, the present disclosure provides a shaped thermal filler particle having an elongate shape defined by a planar first smooth surface, a second smooth surface that contacts the planar first smooth surface along a closed path, wherein at least a portion of the second smooth surface is convex, wherein the closed path has a length to width ratio of at least 1.5 and wherein the shaped thermal filler particle has a maximum linear dimension (which may or may not be the thickness of the shaped thermal filler particle) normal to the planar first smooth surface that is less than or equal to one half of the length in of the closed path.

In a second aspect, the present disclosure provides a composition comprising from 1 to 95 percent by volume of shaped thermal filler particles according to the present disclosure dispersed in an organic binder.

In some embodiments, the thermally conductive composition is hardened and/or chemically crosslinked.

In a third aspect, the present disclosure provides an assembly comprising:
a heat source;
a heat sink; and
a thermally conductive composition according to the present disclosure at least partially sandwiched between the heat source and the heat sink.

As used herein:

The term "chemically crosslinked" means crosslinked by covalent bonds between atoms.

The term "smooth" means free of abrupt surface features such as, for example, predetermined sharp points or steep ridges; however, minor recesses such as, for example, bore holes and/or grooves, and random manufacturing defects such as, for example, slight dishing, are permissible.

The term "planar" means lying in a plane (i.e., two-dimensional); however, minor recesses such as, for example, bore holes and/or grooves, and random manufacturing defects such as, for example, slight dishing, are permissible.

The term "inorganic" refers to a composition of material selected amongst i) oxides, carbides, nitrides, borides, phosphides, arsenides, chalcogenides, and halides of metals or metalloids; ii) metals or metalloids, including elemental metals, alloys, and intermetallic compounds: iii) any of various allotropes of carbon, including graphite, graphene, carbon nanotubes, diamond, and iv) combinations thereof.

The term "shaped" means intentionally formed (e.g., by a molding or printing process) according to a nominal shape, although a minor amount of random or repeating manufacturing defects is permissible.

The term "length" refers to the maximum linear dimension of an object:

The term "width" refers to the maximum linear dimension of an object that is perpendicular to its length; and The term "thickness" refers to the maximum linear dimension of an object that is perpendicular to both the length and width.

Features and advantages of the present disclosure will be further understood upon consideration of the detailed description as well as the appended claims.

Figure 1A:
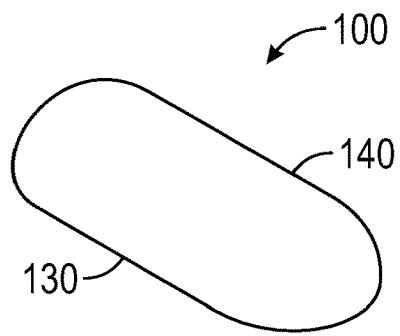
FIG. 1A is a perspective view of exemplary shaped thermal filler particle 100.
Figure 1B:
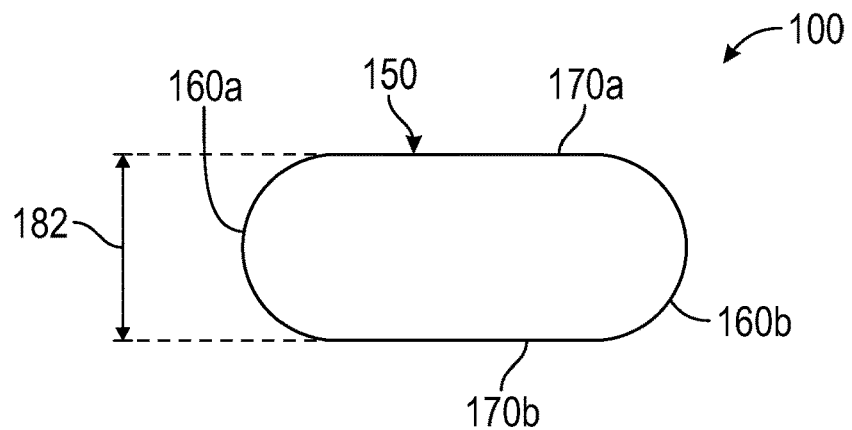
FIG. 1B is a top view of shaped thermal filler particle 100.
Figure 1C:
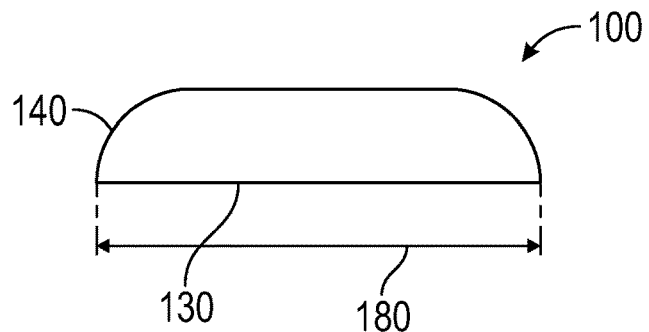
FIG. 1C is a side view of shaped thermal filler particle 100.
Figure 1D:
FIG. 1D is an end view of shaped thermal filler particle 100.
Figure 2A:
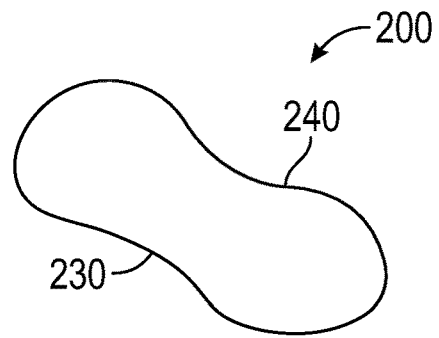
FIG. 2A is a perspective view of exemplary shaped thermal filler particle 200.
Figure 2B:
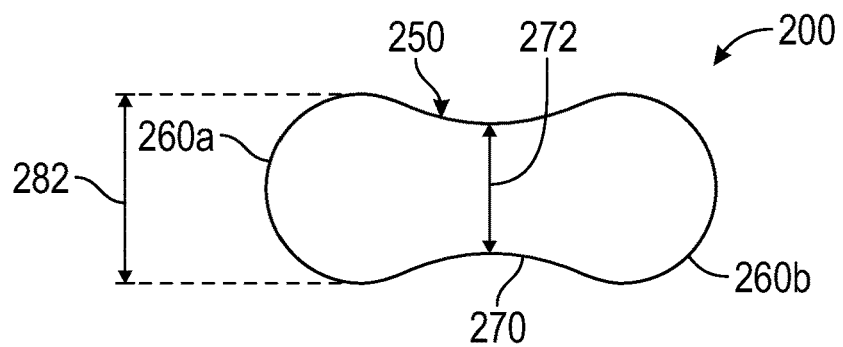
FIG. 2B is a top view of shaped thermal filler particle 200.
Figure 2C:
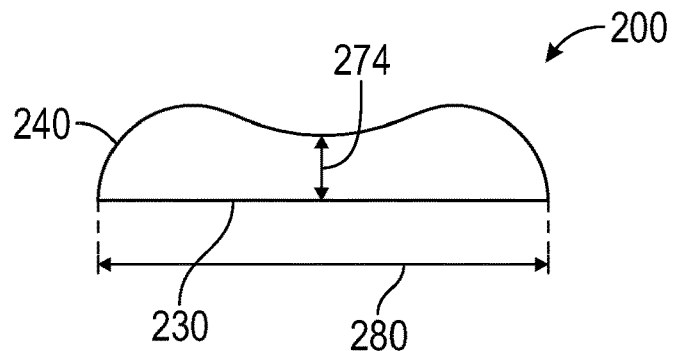
FIG. 2C is a side view of shaped thermal filler particle 200.
Figure 2D:
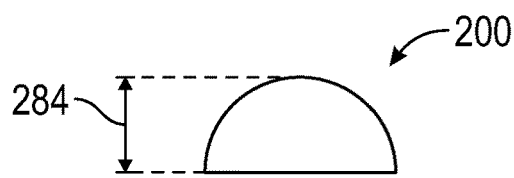
FIG. 2D is an end view of shaped thermal filler particle 200.
Figure 3A:
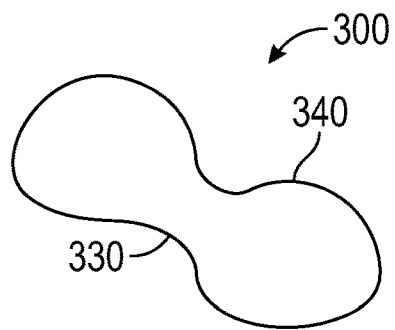
FIG. 3A is a perspective view of exemplary shaped thermal filler particle 300.
Figure 3B:
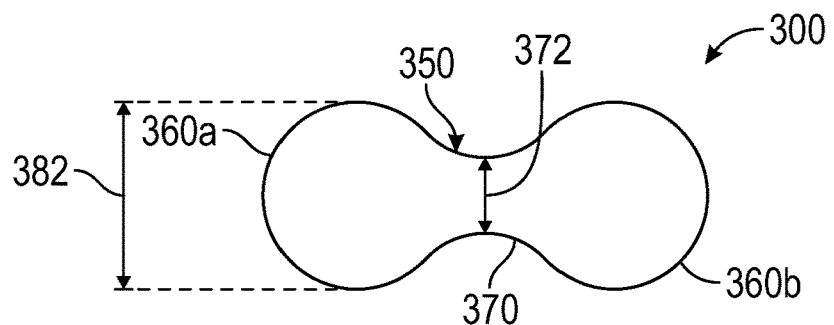
FIG. 3B is a top view of shaped thermal filler particle 300.
Figure 3C:
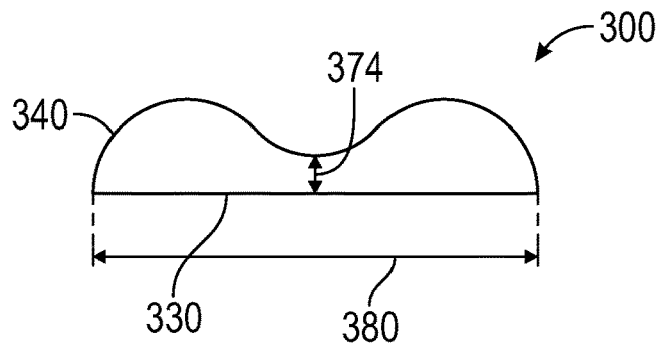
FIG. 3C is a side view of shaped thermal filler particle 300.
Figure 3D:
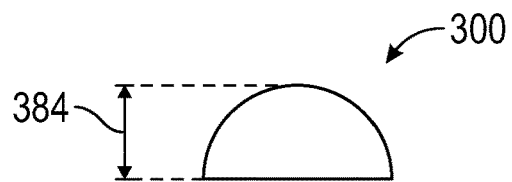
FIG. 3D is an end view of shaped thermal filler particle 300.
Figure 4A:
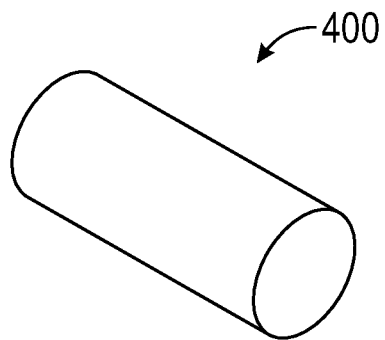
FIG. 4A is a perspective view of comparative particle 400.
Figure 4B:
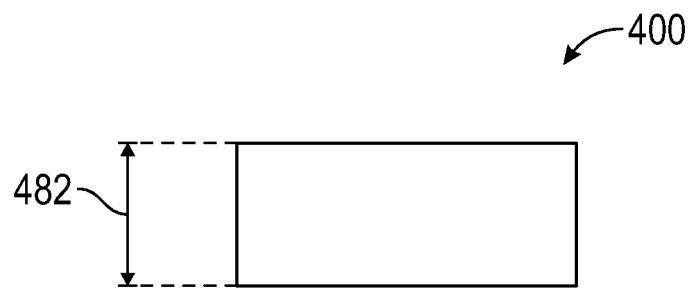
FIG. 4B is a top view of comparative particle 400.
Figure 4C:
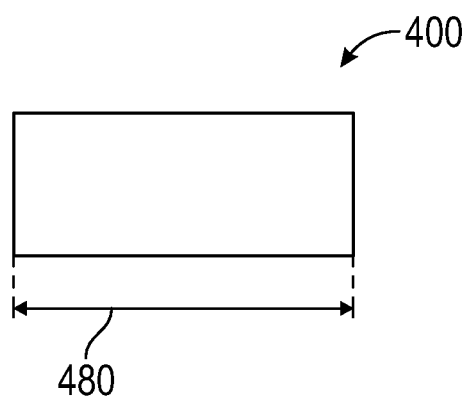
FIG. 4C is a side view of comparative particle 400.
Figure 4D:
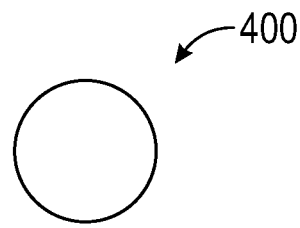
FIG. 4D is an end view of comparative particle 400.

Repeated use of reference characters in the specification and drawings is intended to represent the same or analogous features or elements of the disclosure. It should be understood that numerous other modifications and embodiments can be devised by those skilled in the art, which fall within the scope and spirit of the principles of the disclosure. The figures may not be drawn to scale.

DETAILED DESCRIPTION

Referring now to FIGS. 1A-ID, shaped thermal filler particle 100 has a shape defined by a substantially planar first smooth surface 130 and a second smooth surface 140 that contacts the substantially planar first smooth surface along a closed path 150. In this embodiment, the substantially planar closed path has two semicircular ends 160a, 160b connected by two parallel line segments 170a, 170b (i.e., a "racetrack oval"). Shaped thermal filler particle 100 has length 180, width 182, and thickness 184. In this embodiment, thickness 184 is the maximum linear dimension normal to the planar first smooth surface.

In many embodiments, the substantially planar closed path has a "dogbone" shape. Examples of such paths include Cassini ovals and similar shapes, for example.

Referring now to FIGS. 2A-2D, shaped thermal filler particle 200 also has a shape defined by a substantially planar first smooth surface 230 and a second smooth surface 240 that contacts the substantially planar first smooth surface along a closed path 250. In this embodiment, the substantially planar closed path has two rounded ends 260a, 260b and a relatively narrower waist 270 disposed therebetween. Shaped thermal filler particle 200 has length 280 (coincident with the length of closed path 250), width 282 (coincident with the width of closed path 250), and thickness 284. Waist 270 has a waist width of 272 and a waist thickness 274. In this embodiment, thickness 284 is the maximum linear dimension normal to the planar first smooth surface.

Referring now to FIGS. 3A-3D, shaped thermal filler particle 300 also has a shape defined by a substantially planar first smooth surface 330 and a second smooth surface 340 that contacts the substantially planar first smooth surface along a closed path 350. In this embodiment, the substantially planar closed path has two rounded ends 360a, 360b and a relatively narrower waist 370 disposed therebetween. Shaped thermal filler particle 300 has length 380 (coincident with the length of closed path 350), width 382 (coincident with the width of closed path 350), and thickness 384. Waist 370 has a waist width of 372 and a waist thickness 374. In this embodiment, thickness 384 is the maximum linear dimension normal to the planar first smooth surface.

In some embodiments, the waist width (272, 372) is from 10% to 90% of the particle width (282, 382), in other embodiments from 25% to 80%, in other embodiments from 30% to 70% and in yet other embodiments from 35% to 50%. The selection of waist width, as a percentage of the particle width, depends on a complex trade-off between, at least, thermal transport through the waist (preferred to be high and decreases with decreasing waist width), particle mass (preferred to be low and decreases with decreasing waist width), and particle bend strength (preferred to be high and decreases with decreasing waist width).

In some embodiments, the waist thickness (274, 374) is from 10% to 90% of the particle thickness (284, 384), in other embodiments from 25% to 80%, in other embodiments from 30% to 70% and in yet other embodiments from 35% to 50%. The selection of waist thickness, as a percentage of the particle thickness, depends on a complex trade-off between, at least, thermal transport through the waist (preferred to be high and decreases with decreasing waist thickness), particle mass (preferred to be low and decreases with decreasing waist thickness), and particle bend strength (preferred to be high and decreases with decreasing waist thickness).

Closed paths 150, 250, and 350 comprise at least some convex portions, for example portions at the rounded ends (160a, 160b, 260a, 260b, 360a, 360b) in FIGS. 1A-1D, 2A-2D, 3A-3D, FIGS. 4A-4D show a comparative particle 400 in the shape of a right cylinder defined by a length 480 and diameter 482. For such right cylinder shapes of particles, the diameter of the cylinder is alternatively referred to herein as the width of the cylinder. The aspect ratio of particle 400 in the shape of a right cylinder is given by the length divided by the diameter (or width).

In some embodiments, the shaped thermal filler particles have a length to width ratio of at least 1.5 and a length to thickness ratio (i.e., aspect ratio) of at least 1.5. In some embodiments, the shaped thermal filler particles have a length to width ratio (i.e., aspect ratio) of at least 2, at least 2.5, at least 3, at least 3.5, at least 4, at least 5, or even at least 10. In some embodiments the length to width ratio is between 1.5 and 10, between 2 and 5, or between 2.5 and 4.

In some embodiments of the shaped thermal filler particle, the closed path has a length to width ratio of at least 1.5 and the shaped thermal filler particle has a ratio of length of the closed path to maximum linear dimension normal to the planar surface of at least 1.5. In some embodiments of the shaped thermal filler particle, the shaped thermal filler particle has a ratio of length of the closed path to maximum linear dimension normal to the planar surface of at least 2, at least 2.5, at least 3, at least 3.5, at least 4, at least 5, or even at least 10. If a shaped thermal filler particle has a ratio of length of the closed path to maximum linear dimension normal to the planar surface of at least 2 (2.5, 3, 3.5, 4, 5, 10), that is equivalent to the shaped thermal filler particle having a maximum linear dimension normal to the planar first smooth surface that is less than or equal to one half (one divided by 2.5, one third, one divided by 3.5, one fourth, one fifth, one tenth) of the length of the closed path.

In order for the filler particles of the present disclosure to have a finite volume, their second smooth surface (that contacts the substantially planar first smooth surface along a closed path) must extend away from the first smooth surface. The extension of the second smooth surface from the plane of the substantially planar first smooth surface, together with the fact that the second smooth surface contacts the substantially planar first smooth surface along a closed path, results in at least a portion (also referred to herein as a region) of the second smooth surface having convexity (also referred to herein as being a convex surface portion or surface region). In preferred embodiments, regions of the second surface at the opposite ends of the elongate filler particles are smooth and convex. For clarity, the convexity of regions of second smooth surfaces 140, 240, and 340 in FIGS. 1C, 2C, and 3C, respectively, at the opposite ends of the elongate filler particles are illustrated as smooth and convex. It is possible for filler particles of the present disclosure also to include portions or regions of the second smooth surface that have concavity (also referred to herein as being a concave surface portion or surface region). It is also possible for filler particles of the present disclosure also to include portions or regions of the second smooth surface that have a saddle shape.

Some preferred embodiments of the thermal filler particles of the present disclosure can be defined in terms of the radius of curvature of convex surface regions of the second smooth surface (e.g., radius of curvature of smooth and convex regions of the second surface at the opposite ends of elongate filler particles). For example, in some embodiments, the radius of curvature at the opposite ends of the shaped thermal filler particle, in a plane that is defined by the length and thickness directions of the particle, may be at least 0.11, 0.12, 0.14, 0.17, 0.20, 0.25, 0.33, 0.50, 1, 2, or 4 times the thickness of the shaped thermal filler particle. In some embodiments, the radius of curvature at the opposite ends of the shaped thermal filler particle, in a plane that is defined by the length and thickness directions of the particle, may be 0.10 to 4 times the thickness of the shaped thermal filler particle, 0 0.20 to 2 times, or 0.25 to 1 times the thickness of the shaped thermal filler particle. In some embodiments, the radius of curvature at the opposite ends of the shaped thermal filler particle, in a plane that is defined by the length and width directions of the particle, may be at least 0.11, 0.12, 0.14, 0.17, 0.20, 0.25, 0.33, 0.50, 1, 2, or 4 times the width of the shaped thermal filler particle. In some embodiments, the radius of curvature at the opposite ends of the shaped thermal filler particle, in a plane that is defined by the length and width directions of the particle, may be 0.10 to 4 times the width of the shaped thermal filler particle. 0.20 to 2 times the width. 0.25 to 0.75 times the width, or approximately 0.5 times the width of the shaped thermal filler particle. The above mentioned radiuses of curvature may be the same or different at opposite ends of a shaped thermal filler particle.

The first smooth surface is substantially planar. It is nominally planar except for minor irregularities such as, for example, meniscus-related defects, shrinkage-related defects, minor voids due to mold filling defects and or mold dewetting defects. In preferred embodiments, the first smooth surface is planar.

Like the first smooth surface, the second smooth surface may have minor irregularities such as, for example, meniscus-related defects, shrinkage-related defects, minor voids due to mold filling defects and or mold dewetting defects. In some embodiments, the second smooth surface is at least substantially convex: for example, completely convex. For clarity, the second smooth surface 140 of shaped thermal filler particle 100 in FIG. 1 is illustrated to be completely convex.

The shaped thermal filler particles may comprise an inorganic material.

Exemplary useful shaped thermal filler particles include shaped thermal filler particles comprising at least one of aluminum oxide (alumina), magnesium oxide, aluminum hydroxide, silicon nitride, zinc oxide, silicon oxide, beryllium oxide, titanium oxide, copper oxide, cuprous oxide, boron nitride, aluminum nitride, silicon carbide, diamond, talc, mica, kaolin, bentonite, magnesite, pyrophyllite, titanium boride, calcium titanate, metal (e.g., copper, aluminum, brass, steel, bronze), graphite, carbon black, graphene, and combinations thereof. Other thermally conductive materials may also be used.

While the shaped thermal filler particles may have any thermal conductivity, if they are incorporated in a binder, they will generally have a higher thermal conductivity than the binder. Boron nitride may have any structure, such as c-BN (cubic structure), w-BN (wurtzite structure), h-BN (hexagonal structure), r-BN (rhombohedral structure), or t-BN (turbostratic structure). Among these, from the perspectives of thermal conductivity and cost, aluminum oxide, aluminum hydroxide, zinc oxide, boron nitride, and aluminum nitride are often preferred. Aluminum oxide is often more preferred.

In some embodiments, the shaped thermal particles comprise thermal filler particles retained in an organic binder. In one common method, a mixture comprising thermal filler particles and a precursor material for the organic binder (organic binder precursor) are disposed into mold cavities in a production tool and cured (e.g., by heat, light, and/or an initiator or catalyst) or otherwise hardened (e.g., by cooling or drying).

Examples of suitable organic binder precursors include solvent-borne thermoplastic polymer and/or thermosetting resins. Examples of suitable thermoplastic polymers include polyolefins, polyesters, thermoplastic polyurethanes, and polyamides. Examples of thermosetting resins include epoxy resins, urethane resins, ring-opening metathesis polymerization (ROMP) cycloolefin resins, isocyanurate resins, free-radically polymerizable resins (e.g., mono- and/or polyfunctional acrylates, methacrylates, acrylamides, vinyl ethers, and/or maleates), phenolic resins, urea-formaldehyde resins, aminoplast resins, silicone resins, and crosslinking polymer latexes.

Details concerning general methods for forming shaped composite particles having an organic binder matrix can be found, for example, in U.S. Pat. No. 5,714,259 (Holmes et al.).

In some embodiments, the shaped thermal filler particles have a thermal conductivity of at least 1 $Wm^{-1}K^{-1}$ (W/mK), at least 2 $Wm^{-1}K^{-1}$, at least 2.5 $Wm^{-1}K^{-1}$, at least 5 $Wm^{-1}K^{-1}$, at least 10 $Wm^{-1}K^{-1}$, at least 15 $Wm^{-1}K^{-1}$, at least at least 20 $Wm^{-1}K^{-1}$, or even at least at least 30 $Wm^{-1}K^{-1}$ although lower thermal conductivities may also be used.

Preferably, the shaped filler particles have a narrower particle size distribution. For example, the shaped filler particles may have a size distribution with a span of less than or equal to 0.1. Span is defined as the quantity $(D_{90}-D_{10})/D_{50}$, wherein Doo refers to the particle size in the size distribution, up to and including which. 90 percent of the total volume of material in the sample is contained. Similarly. $D_{50}$ refers to the particle size in the size distribution, up to and including which. 50 percent of the total volume of material in the sample is contained, and $D_{10}$ is that particle size below which 10 percent by volume of the material is contained. $D_{10}$, $D_{50}$, and $D_{90}$ may be determined, for example, laser diffraction or microscopic inspection.

The shaped thermal filler particles may have any size, but preferably are in a size range of from 10 microns to 2 millimeters (mm), more preferably from 25 microns to 1 mm, and more preferably 50 microns to 1 mm in length.

The shaped filler particles can be made, for example, by a molding process in which a production tool having a plurality of shaped mold cavities disposed on its surface. Precursor material (e.g., a sol-gel or, slurry or other dispersion of thermal filler particles in a suitable binder precursor. Once in the mold cavities the precursor material is hardened (e.g., by drying (inorganic shaped filler particles) or curing (inorganic filler particles in an organic polymer matrix)), then optionally calcined and/or sintered in the case of inorganic shaped filler particles. General details concerning such processes can be found in, for example, in U.S. Pat. No. 10,315,289 B2 (Fletcher et al.) and U.S. Pat. No. 5,714,259 (Holmes et al.), the disclosures of which are incorporated herein by reference.

Thermally conductive compositions according to the present disclosure comprise from 1 to 95 percent by volume, preferably 10 to 50 percent by volume, more preferably 10 to 40 percent by volume, of shaped thermal filler particles dispersed in an organic binder. In some embodiments, the shaped thermal filler particles comprise from 12 to 36 percent by volume of the thermally conductive composition.

In some embodiments, thermally conductive compositions according to the present disclosure may comprise of both shaped thermal filler particles according to the present disclosure and secondary thermal filler particles. In this instance, the shaped thermal filler particles may comprise the majority or minority of the total thermal filler package by volume, that is to say greater than 50 percent by volume or less than 50 percent by volume of the total thermal filler is shaped filler. The secondary thermal filler particles may comprise of an inorganic material. Exemplary useful particles include particles comprising at least one of aluminum oxide (alumina), magnesium oxide, aluminum hydroxide, silicon nitride, zinc oxide, silicon oxide, beryllium oxide, titanium oxide, copper oxide, cuprous oxide, boron nitride, aluminum nitride, silicon carbide, diamond, talc, mica, kaolin, bentonite, magnesite, pyrophyllite, titanium boride, calcium titanate, metal (e.g., copper, aluminum, brass, steel, bronze), graphite, carbon black, graphene, and combinations thereof. Other thermally conductive materials may also be used. The secondary particles may also be shaped or not.

In some embodiments, the organic binder comprises a grease such as for example, a silicone grease or a hydrocarbon grease.

In some embodiments, the organic binder is formed by hardening a hardenable organic binder precursor. Exemplary hardenable organic binder precursors include polymerizable resins such as epoxy resins, urethane resins, ring-opening metathesis polymerization (ROMP) cycloolefin resins, isocyanurate resins, free-radically polymerizable resins (e.g., mono and/or polyfunctional acrylates, methacrylates, acrylamides, vinyl ethers, and/or maleates), phenolic resins, urea-formaldehyde resins, aminoplast resins, silicone resins, and crosslinkable polymer latexes. Polymerizable resins typically further include a catalyst, crosslinker, and/or initiator (thermal initiator and/or photoinitiator) suitable for causing polymerization, although this is not a requirement. The selection and amount (e.g., 0.01 to 10 percent by weight) of the catalyst, crosslinker, and/or initiator will depend on the specific chemical system chosen, and is within the capability of those of ordinary skill in the art.

Exemplary hardenable organic binder precursors also include solvent-borne thermoplastic polymers, molten polymers (e.g., molten hot melt adhesives), and non-crosslinking latexes (e.g., acrylic latexes). The thermally conductive compositions according to the present disclosure and/or hardened sheets derived therefrom of are useful, for example, in electronics applications as gap fillers between an electronic component (heat source) and a heat sink.

In some embodiments, the thermally conductive composition may be provided as a hardened sheet, or more typically, as a flowable hardenable composition that is applied (e.g., using a nozzle dispenser) to at least one of the electronic component or the heat sink which as then brought together with the thermally conductive composition disposed therebetween. Subsequent hardening of the thermally conductive composition results in a hardened thermally conductive composition.

Figure 17:
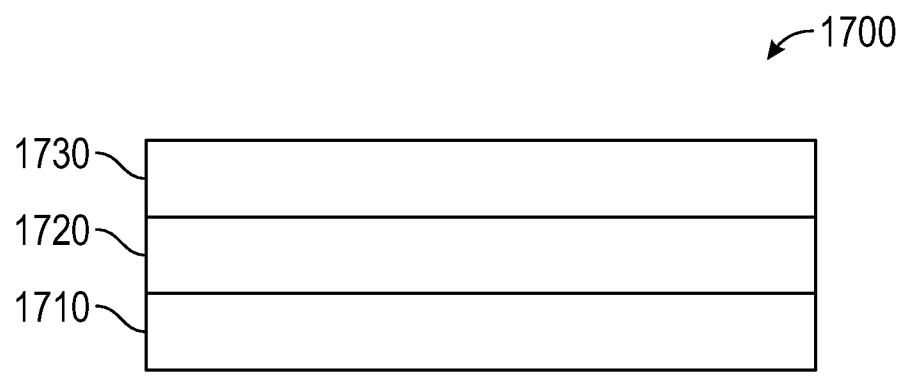
FIG. 17 is a schematic side view of an exemplary assembly 1700 according to the present disclosure.

Thermally conductive compositions according to the present disclosure as useful, for example, for conducting thermal energy from a heat source to a heat sink. Referring now to FIG. 17, exemplary assembly 1700 according to the present disclosure comprises heat source 1710, heat sink 1730, and thermally conductive composition 1720, as described herein at least partially sandwiched between the heat source and the heat sink.

The shaped thermal filler particles may be present within the thermally conductive composition in any arrangement. The term arrangement (or arranged) refers to the positions and orientations of the shaped thermal filler particles. The shaped thermal filler particles within a thermally conductive composition are described herein to be aligned if they are positioned at least approximately along a line. The shaped thermal filler particles within a thermally conductive composition are described herein to be oriented if their length directions are approximately parallel with each other. In some embodiments, the shaped thermal filler particles within the thermally conductive composition sandwiched in an assembly between a heat source and a heat sink are arranged at least approximately in alignment with the heat transport direction. In other embodiments, the shaped thermal filler particles within the thermally conductive composition sandwiched in an assembly between a heat source and a heat sink are arranged such that their length directions are oriented at least approximately parallel to the heat transport direction. In yet other embodiments, the shaped thermal filler particles within the thermally conductive composition sandwiched in an assembly between a heat source and a heat sink are arranged at least approximately in alignment with the heat transport direction and such that their length directions are oriented at least approximately parallel to the heat transport direction. In some embodiments, for ease of processing, the shaped thermal filler particles are preferably randomly arranged in the thermally conductive composition, although this is not a requirement. In some embodiments, for ease of processing, the shaped thermal filler particles are preferably randomly positioned in the thermally conductive composition, although this is not a requirement. In some embodiments, for ease of processing, the shaped thermal filler particles are preferably randomly oriented in the thermally conductive composition, although this is not a requirement. Advantageously, it is presently discovered that randomly oriented shaped particles according to the present disclosure are unexpectedly effective at improving important tradeoffs between thermal energy transfer (e.g., as quantified by effective, or composite, thermal conductivity) and other properties (e.g., density), as compared with known particle shapes such as right cylinders. However, if desired, the shaped thermal filler particles may be oriented with respect to each other or the heat transport direction, as described above.

Examples of heat sources include, for example, semiconductor devices (e.g., diodes, integrated circuits, transistors), resistors, inductors, motors, generators, batteries and transformers.

Heat sinks are well-known in the art, and are often formed of thermally conductive material (e.g., a metal) having substantial thermal mass relative to the part that they are intended to cool. Often, the heat sink comprises cooling fins and/or posts. Alternatively, some heat sinks may include integral flow channels for the passage of coolant fluid (e.g., water).

Objects and advantages of this disclosure are further illustrated by the following non-limiting examples, but the particular materials and amounts thereof recited in these examples, as well as other conditions and details, should not be construed to unduly limit this disclosure.

EXAMPLES

Unless otherwise noted, all parts, percentages, ratios, etc. in the Examples and the rest of the specification are by weight.

General Modeling Procedure

Particles (shapes A, B, and C) as defined in TABLE 1 and shown in FIGS. 1A-1D, 2A-2D, and 3A-3D, respectively, were drawn in the CAD software SOLIDWORKS (Dassault Systèmes SolidWorks Corporation. Waltham. Massachusetts). Composites of arrayed particles within bounding boxes were then generated with differing relative particle volumes. Right circular cylinders (shapes D and E) as defined in Table 1 and generally shown in FIGS. 4A-4D were also modeled as Comparative Modeling Examples and were chosen to match the volume and length to width ratio of the particle of shapes 0.4 and C, respectively. These CAD assemblies were then loaded into ANSYS v 19.1 finite element analysis software (ANSYS. Inc., Canonsburg. Pennsylvania) and the Steady-State Thermal module was used to calculate the effective thermal conductivity of each representative volume. For each representative volume, the particles were assigned to have a thermal conductivity of 35 $Wm^{-1}K^{-1}$ and the volume around the particles was assigned to have a thermal conductivity of 0.16 $Wm^{-1}K^{-1}$.

To calculate the effective thermal conductivity of the representative volume along a given axis, a face of the bounding box was held at a constant temperature of 273 K while a constant heat flux of 100 $W/m^2$ is applied to the opposing face of the box. All other faces were perfectly insulating. The average temperature of the opposing face of the box was then probed at steady state conditions and from that the effective thermal conductivity can be calculated using Fourier's Law ($q=-k\nabla T$) where q is the heat flux, k is the thermal conductivity, and $\nabla T$ is the temperature difference across the sample. The effective thermal conductivity between any opposing faces was determined in this manner. The effective thermal conductivity as a function of volume fraction or theoretical composite density was compared between particle shapes and along different axes. For comparing composite density, a density of 3.95 $g/cm^3$ was assigned to the particles and a density of 1 $g/cm^3$ was assigned to surrounding volume.

Figure 5A:
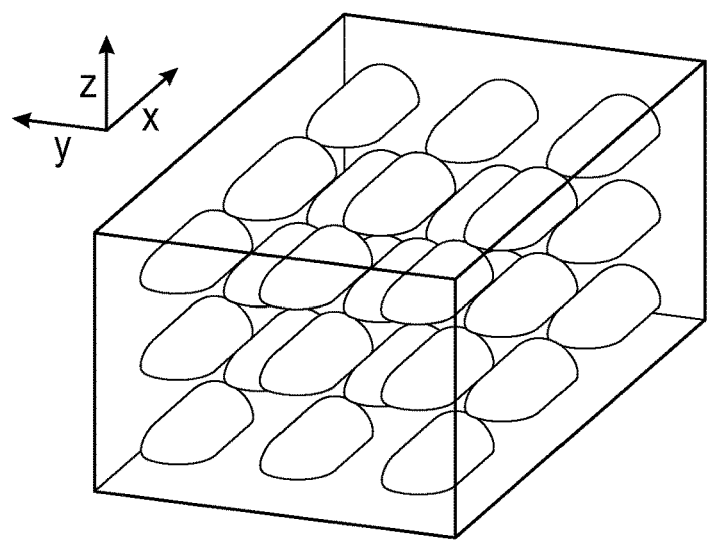
FIG. 5A is a perspective view of Modeling Example 1 featuring shaped thermal filler particle 100.
Figure 5B:
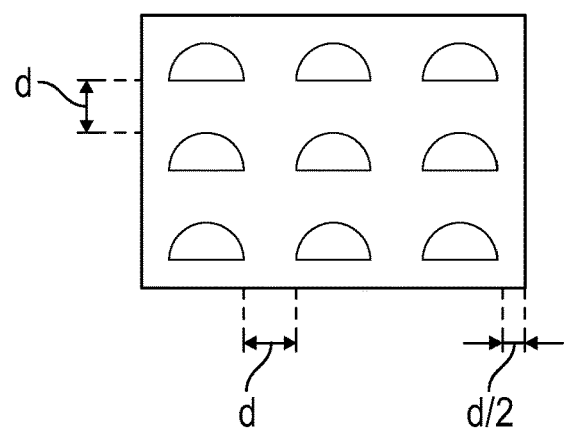
FIG. 5B is an end view of Modeling Example 1 featuring shaped thermal filler particle 100.
Figure 5C:
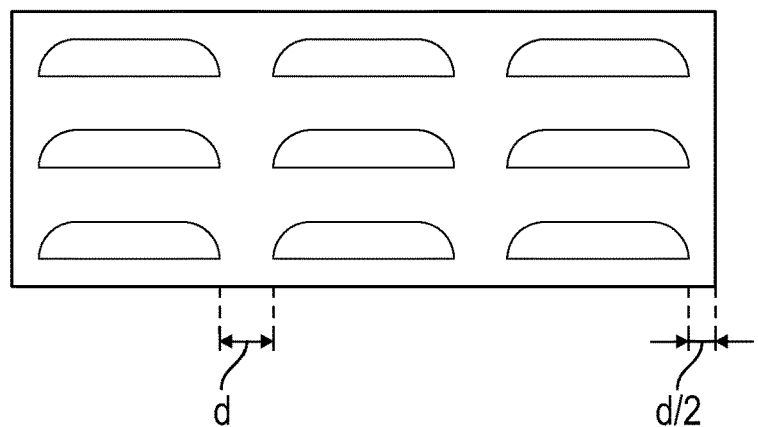
FIG. 5C is a side view of Modeling Example 1 featuring shaped thermal filler particle 100.
Figure 6A:
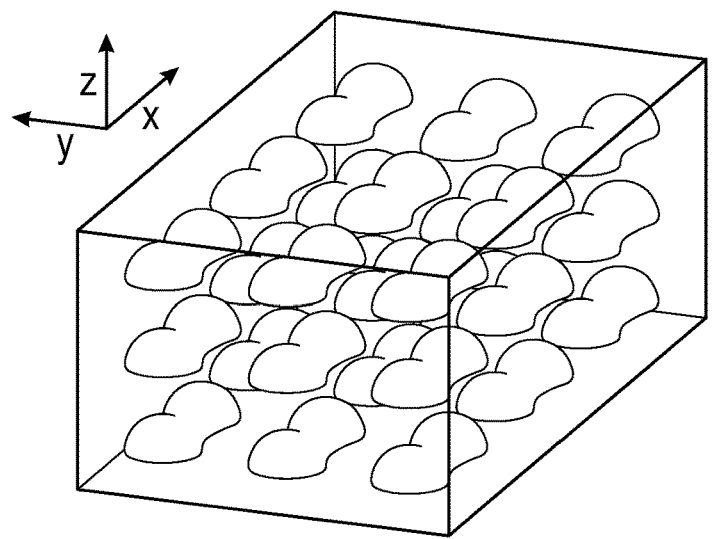
FIG. 6A is a perspective view of Modeling Example 4 featuring shaped thermal filler particle 200.
Figure 6B:
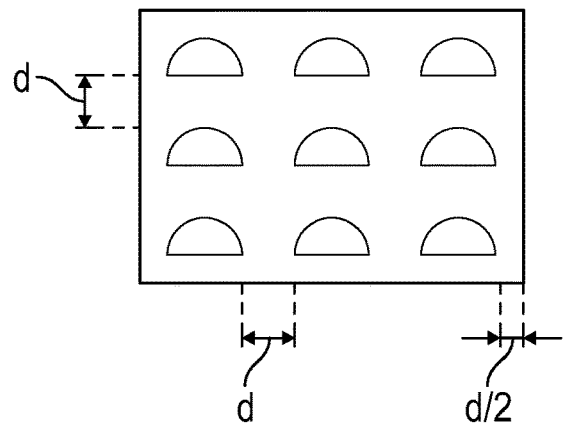
FIG. 6B is an end view of Modeling Example 4 featuring shaped thermal filler particle 200.
Figure 6C:
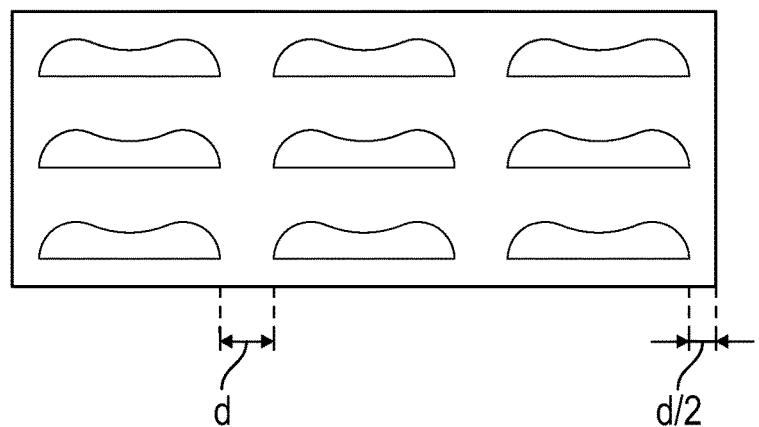
FIG. 6C is a side view of Modeling Example 4 featuring shaped thermal filler particle 200.
Figure 7A:
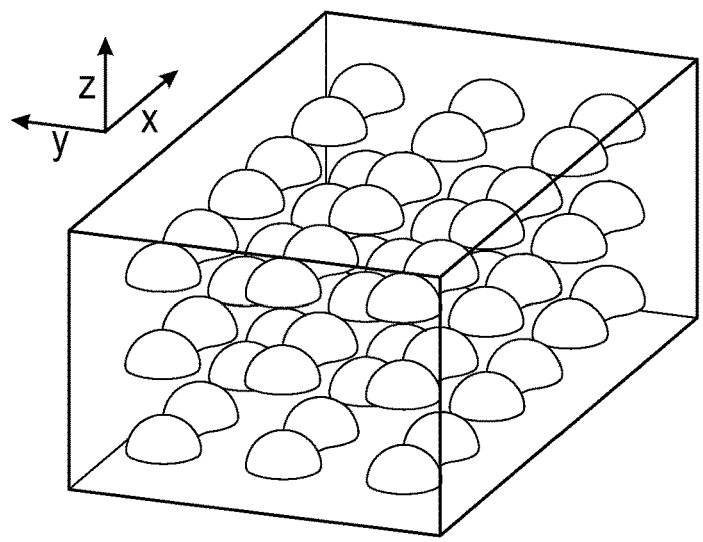
FIG. 7A is a perspective view of Modeling Example 7 featuring shaped thermal filler particle 300.
Figure 7B:
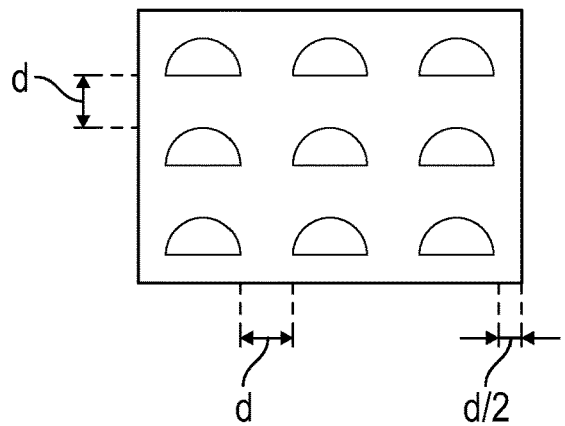
FIG. 7B is an end view of Modeling Example 7 featuring shaped thermal filler particle 300.
Figure 7C:
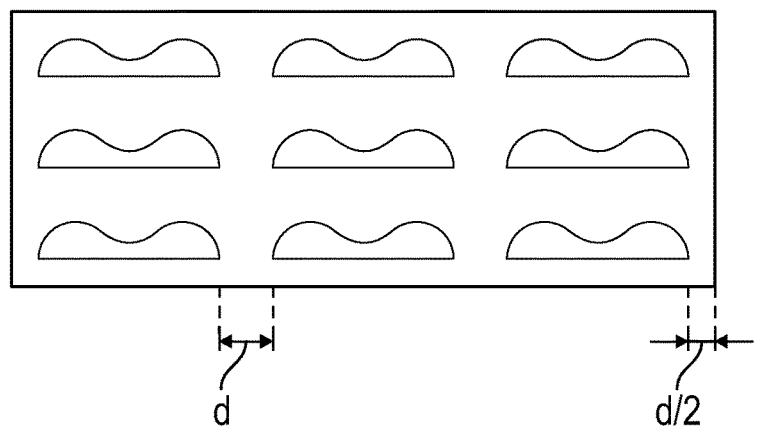
FIG. 7C is a side view of Modeling Example 7 featuring shaped thermal filler particle 300.

For Modeling Examples 1 through 9, a CAD geometry was constructed by creating a 3×3×3 array of particles having Shape A. B. or C oriented with their long axes parallel to the x-axis. The particle-to-particle spacing in each of the three primary directions (x, v, z) is defined as d. A bounding box was superimposed on this array such that the distance between each outer particle and the nearest face of the box is d/2 as illustrated in FIG. 5, 6, or 7 for Shape A, B, or C, respectively. The dimensions of the bounding box are therefore defined by the dimensions of the particles and d. Composite volume fraction was varied by changing the value of d while leaving particle dimensions fixed. Variability in composite volume fractions arises from volume variability between particle designs.

For Modeling Examples 10 through 21 and Comparative Modeling Examples A and B, a CAD geometry consisting of an equal distribution of particles oriented with their long axis parallel to each principal direction (x, y, z) was constructed. An array of particles was built by placing either the center of the planar face (shapes A, B, and C) or the center of volume (shapes D and E) at the provided coordinates (related to a, the unit cell length), the long axis direction, and the surface normal of the planar face (where applicable) in Table 2.

A 2a×2a×2a bounding box with its origin at (0,0,0) was then superimposed on the array and all particle volumes that exist external to the box are then truncated to the surface of the box as illustrated in FIG. 8, 9, 10, 11, or 12 for Shape A, B, C, D, or E, respectively. The particle-to-particle spacing and thus the volume fraction of particles was adjusted by varying the unit cell length, a. The value of a was chosen such that particles did not intersect.

Modeling Example 1

Following the General Modeling Procedure, Shape A was arranged into a 3×3×3 array, uniformly spaced in a bounding box of dimensions 1.314×0.720×0.510 mm$^3$ leading to a particle content of 12.5 volume percent and density 1.37 g/cm$^3$. The particle-to-particle spacing, d, was 0.100 mm.

Modeling Example 2

Following the General Modeling Procedure, Shape A was arranged into a 3×3×3 array, uniformly spaced in a bounding box of dimensions 1.164×0.570×0.360 mm$^3$ leading to a particle content of 25.3 volume percent and density 1.75 g/cm$^3$. The particle-to-particle spacing, d, was 0.050 mm.

Modeling Example 3

Following the General Modeling Procedure, Shape A was arranged into a 3×3×3 array, uniformly spaced in a bounding box of dimensions 1.044×0.450×0.240 mm$^3$ leading to a particle content of 53.7 volume percent and density 2.58 g/cm$^3$. The particle-to-particle spacing, d, was 0.010 mm.

Modeling Example 4

Following the General Modeling Procedure, Shape B was arranged into a 3×3×3 array, uniformly spaced in a bounding box of dimensions 1.314×0.720×0.510 mm$^3$ leading to a particle content of 10.0 volume percent and density 1.30 g/cm$^3$. The particle-to-particle spacing, d, was 0.100 mm.

Modeling Example 5

Following the General Modeling Procedure, Shape B was arranged into a 3×3×3 array, uniformly spaced in a bounding box of dimensions 1.164×0.570×0.360 mm$^3$ leading to a particle content of 20.2 volume percent and density 1.60 g/cm$^3$. The particle-to-particle spacing, d, was 0.050 mm.

Modeling Example 6

Following the General Modeling Procedure, Shape B was arranged into a 3×3×3 array, uniformly spaced in a bounding box of dimensions 1.044×0.450×0.240 mm$^3$ leading to a particle content of 42.8 volume percent and density 2.26 g/cm$^3$. The particle-to-particle spacing, d, was 0.010 mm.

Modeling Example 7

Following the General Modeling Procedure, Shape C was arranged into a 3×3×3 array, uniformly spaced in a bounding box of dimensions 1.314×0.720×0.510 mm$^3$ leading to a particle content of 8.7 volume percent and density 1.26 g/cm$^3$. The particle-to-particle spacing, d, was 0.100 mm.

Modeling Example 8

Following the General Modeling Procedure, Shape C was arranged into a 3×3×3 array, uniformly spaced in a bounding box of dimensions 1.164×0.570×0.360 mm$^3$ leading to a particle content of 17.6 volume percent and density 1.52 g/cm$^3$. The particle-to-particle spacing, d, was 0.050 mm.

Modeling Example 9

Following the General Modeling Procedure, Shape C is arranged into a 3×3×3 array, uniformly spaced in a bounding box of dimensions 1.044×0.450×0.240 mm$^3$ leading to a particle content of 37.2 volume percent and density 2.10 g/cm$^3$. The particle-to-particle spacing, d, was 0.010 mm.

Modeling Example 10

Following the General Modeling Procedure, Shape A was arranged into an array with positions described in Table 2, distributed in a bounding box described by unit dimension, a, of 0.582 mm leading to a particle content of 10.2 volume percent and density 1.30 g/cm$^3$.

Modeling Example 11

Following the General Modeling Procedure, Shape A was arranged into an array with positions described in Table 2, distributed in a bounding box described by unit dimension, a, of 0.500 mm leading to a particle content of 16.1 volume percent and density 1.48 g/cm$^3$.

Modeling Example 12

Following the General Modeling Procedure, Shape A was arranged into an array with positions described in Table 2, distributed in a bounding box described by unit dimension, a, of 0.436 mm leading to a particle content of 24.3 volume percent and density 1.72 g/cm$^3$.

Modeling Example 13

Following the General Modeling Procedure, Shape A was arranged into an array with positions described in Table 2, distributed in a bounding box described by unit dimension, a, of 0.386 mm leading to a particle content of 35.1 volume percent and density 2.04 g/cm$^3$.

Modeling Example 14

Following the General Modeling Procedure, Shape B was arranged into an array with positions described in Table 2, distributed in a bounding box described by unit dimension, a, of 0.582 mm leading to a particle content of 8.2 volume percent and density 1.24 g/cm$^3$.

Modeling Example 15

Following the General Modeling Procedure, Shape B was arranged into an array with positions described in Table 2, distributed in a bounding box described by unit dimension, a, of 0.500 mm leading to a particle content of 12.9 volume percent and density 1.38 g/cm$^3$.

Modeling Example 16

Following the General Modeling Procedure, Shape B was arranged into an array with positions described in Table 2, distributed in a bounding box described by unit dimension, a, of 0.436 mm leading to a particle content of 19.4 volume percent and density 1.57 g/cm$^3$.

Modeling Example 17

Following the General Modeling Procedure, Shape B was arranged into an array with positions described in Table 2, distributed in a bounding box described by unit dimension, a, of 0.386 mm leading to a particle content of 28.0 volume percent and density 1.83 g/cm³.

Modeling Example 18

Following the General Modeling Procedure, Shape C was arranged into an array with positions described in Table 2, distributed in a bounding box described by unit dimension, a, of 0.582 mm leading to a particle content of 7.1 volume percent and density 1.21 g/cm³.

Modeling Example 19

Following the General Modeling Procedure, Shape C was arranged into an array with positions described in Table 2, distributed in a bounding box described by unit dimension, a, of 0.500 mm leading to a particle content of 11.2 volume percent and density 1.33 g/cm³.

Modeling Example 20

Following the General Modeling Procedure, Shape C was arranged into an array with positions described in Table 2, distributed in a bounding box described by unit dimension, a, of 0.436 mm leading to a particle content of 16.9 volume percent and density 1.50 g/cm³.

Modeling Example 21

Following the General Modeling Procedure, Shape C was arranged into an array with positions described in Table 2, distributed in a bounding box described by unit dimension, a, of 0.386 mm leading to a particle content of 24.3 volume percent and density 1.72 g/cm³.

In Table 1, below, length and width are determined based on the closed path defining the intersection of the planar surface and the smooth surface and thickness is measured as the length of a vector normal to the planar surface. $Radius_1$ is the radius of curvature of the closed path along the edge of the planar surface at the end of the length of the shape. $Radius_2$ is the radius of curvature along the closed path from the planar surface to the maximum thickness along the long axis of the shape. $Radius_3$ is the radius of curvature along the maximum width of the particle from one planar surface to the other. $Radius_4$ is the radius of curvature that defines the necking region at the waist along the planar surface edge. Particles B and C have waist width, as percentages of their particle widths, of 70% and 41.4%, respectively. Particles B and C have waist thickness, as percentages of their particle thicknesses, of 70% and 41.4%, respectively.

TABLE 1

| PARTICLE/ DIMENSION, millimeters | A | B | C | D | E |
|---|---|---|---|---|---|
| RADIUS₁ | 0.070 | 0.070 | 0.070 | NA | NA |
| RADIUS₂ | 0.070 | 0.070 | 0.070 | NA | NA |
| RADIUS₃ | 0.070 | 0.070 | 0.070 | NA | NA |
| RADIUS₄ | NA | 0.179 | 0.070 | NA | NA |
| LENGTH | 0.338 | 0.338 | 0.338 | 0.255 | 0.226 |
| WIDTH | 0.140 | 0.140 | 0.140 | 0.106 | 0.094 |

TABLE 1-continued

| PARTICLE/ DIMENSION, millimeters | A | B | C | D | E |
|---|---|---|---|---|---|
| WAIST WIDTH | NA | 0.098 | 0.058 | NA | NA |
| THICKNESS | 0.070 | 0.070 | 0.070 | NA | NA |
| WAIST THICKNESS | NA | 0.049 | 0.029 | NA | NA |

Comparative Modeling Example A

Following the General Modeling Procedure, Shape D was arranged into an array with positions described in Table 2, distributed in a bounding box described by unit dimension, a, of 0.436 mm leading to a particle content of 16.1 volume percent and density 1.48 g/cm³.

Comparative Modeling Example B

Following the General Modeling Procedure, Shape E was arranged into an array with positions described in Table 2, distributed in a bounding box described by unit dimension, a, of 0.386 mm leading to a particle content of 11.2 volume percent and density 1.33 g/cm³.

TABLE 2

| | RELATIVE COORDINATES | | | LONG AXIS | SURFACE NORMAL OF |
|---|---|---|---|---|---|
| PARTICLE | x/a | y/a | z/a | DIRECTION | PLANAR SURFACE |
| 1 | −0.167 | 0.333 | 0.333 | [1 0 0] | [0 −1 −1] |
| 2 | −0.167 | 0.333 | 1.333 | [1 0 0] | [0 −1 −1] |
| 3 | −0.167 | 1.333 | 0.333 | [1 0 0] | [0 −1 −1] |
| 4 | −0.167 | 1.333 | 1.333 | [1 0 0] | [0 −1 −1] |
| 5 | 0.000 | 0.000 | 0.500 | [0 0 1] | [−1 −1 0] |
| 6 | 0.000 | 0.000 | 1.500 | [0 0 1] | [−1 −1 0] |
| 7 | 0.000 | 0.500 | 0.000 | [0 1 0] | [−1 0 −1] |
| 8 | 0.000 | 0.500 | 1.000 | [0 1 0] | [−1 0 −1] |
| 9 | 0.000 | 0.500 | 2.000 | [0 1 0] | [−1 0 −1] |
| 10 | 0.000 | 1.000 | 0.500 | [0 0 1] | [−1 −1 0] |
| 11 | 0.000 | 1.000 | 1.500 | [0 0 1] | [−1 −1 0] |
| 12 | 0.000 | 1.500 | 0.000 | [0 1 0] | [−1 0 −1] |
| 13 | 0.000 | 1.500 | 1.000 | [0 1 0] | [−1 0 −1] |
| 14 | 0.000 | 1.500 | 2.000 | [0 1 0] | [−1 0 −1] |
| 15 | 0.000 | 2.000 | 0.500 | [0 0 1] | [−1 −1 0] |
| 16 | 0.000 | 2.000 | 1.500 | [0 0 1] | [−1 −1 0] |
| 17 | 0.167 | 0.667 | 0.667 | [1 0 0] | [0 −1 −1] |
| 18 | 0.167 | 0.667 | 1.667 | [1 0 0] | [0 −1 −1] |
| 19 | 0.167 | 1.667 | 0.667 | [1 0 0] | [0 −1 −1] |
| 20 | 0.167 | 1.667 | 1.667 | [1 0 0] | [0 −1 −1] |
| 21 | 0.333 | −0.167 | 0.333 | [0 1 0] | [−1 0 −1] |
| 22 | 0.333 | −0.167 | 1.333 | [0 1 0] | [−1 0 −1] |
| 23 | 0.333 | 0.333 | −0.167 | [0 0 1] | [−1 −1 0] |
| 24 | 0.333 | 0.333 | 0.833 | [0 0 1] | [−1 −1 0] |
| 25 | 0.333 | 0.333 | 1.833 | [0 0 1] | [−1 −1 0] |
| 26 | 0.333 | 0.833 | 0.333 | [0 1 0] | [−1 0 −1] |
| 27 | 0.333 | 0.833 | 1.333 | [0 1 0] | [−1 0 −1] |
| 28 | 0.333 | 1.333 | −0.167 | [0 0 1] | [−1 −1 0] |
| 29 | 0.333 | 1.333 | 0.833 | [0 0 1] | [−1 −1 0] |
| 30 | 0.333 | 1.333 | 1.833 | [0 0 1] | [−1 −1 0] |
| 31 | 0.333 | 1.833 | 0.333 | [0 1 0] | [−1 0 −1] |
| 32 | 0.333 | 1.833 | 1.333 | [0 1 0] | [−1 0 −1] |
| 33 | 0.500 | 0.000 | 0.000 | [1 0 0] | [0 −1 −1] |
| 34 | 0.500 | 0.000 | 1.000 | [1 0 0] | [0 −1 −1] |
| 35 | 0.500 | 0.000 | 2.000 | [1 0 0] | [0 −1 −1] |
| 36 | 0.500 | 1.000 | 0.000 | [1 0 0] | [0 −1 −1] |
| 37 | 0.500 | 1.000 | 1.000 | [1 0 0] | [0 −1 −1] |
| 38 | 0.500 | 1.000 | 2.000 | [1 0 0] | [0 −1 −1] |
| 39 | 0.500 | 2.000 | 0.000 | [1 0 0] | [0 −1 −1] |
| 40 | 0.500 | 2.000 | 1.000 | [1 0 0] | [0 −1 −1] |
| 41 | 0.500 | 2.000 | 2.000 | [1 0 0] | [0 −1 −1] |

TABLE 2-continued

| PARTICLE | RELATIVE COORDINATES x/a | y/a | z/a | LONG AXIS DIRECTION | SURFACE NORMAL OF PLANAR SURFACE |
|---|---|---|---|---|---|
| 42 | 0.667 | 0.167 | 0.667 | [0 1 0] | [−1 0 −1] |
| 43 | 0.667 | 0.167 | 1.667 | [0 1 0] | [−1 0 −1] |
| 44 | 0.667 | 0.667 | 0.167 | [0 0 1] | [−1 −1 0] |
| 45 | 0.667 | 0.667 | 1.167 | [0 0 1] | [−1 −1 0] |
| 46 | 0.667 | 0.667 | 2.167 | [0 0 1] | [−1 −1 0] |
| 47 | 0.667 | 1.167 | 0.667 | [0 1 0] | [−1 0 −1] |
| 48 | 0.667 | 1.167 | 1.667 | [0 1 0] | [−1 0 −1] |
| 49 | 0.667 | 1.667 | 0.167 | [0 0 1] | [−1 −1 0] |
| 50 | 0.667 | 1.667 | 1.167 | [0 0 1] | [−1 −1 0] |
| 51 | 0.667 | 1.667 | 2.167 | [0 0 1] | [−1 −1 0] |
| 52 | 0.667 | 2.167 | 0.667 | [0 1 0] | [−1 0 −1] |
| 53 | 0.667 | 2.167 | 1.667 | [0 1 0] | [−1 0 −1] |
| 54 | 0.833 | 0.333 | 0.333 | [1 0 0] | [0 −1 −1] |
| 55 | 0.833 | 0.333 | 1.333 | [1 0 0] | [0 −1 −1] |
| 56 | 0.833 | 1.333 | 0.333 | [1 0 0] | [0 −1 −1] |
| 57 | 0.833 | 1.333 | 1.333 | [1 0 0] | [0 −1 −1] |
| 58 | 1.000 | 0.000 | 0.500 | [0 0 1] | [−1 −1 0] |
| 59 | 1.000 | 0.000 | 1.500 | [0 0 1] | [−1 −1 0] |
| 60 | 1.000 | 0.500 | 0.000 | [0 1 0] | [−1 0 −1] |
| 61 | 1.000 | 0.500 | 1.000 | [0 1 0] | [−1 0 −1] |
| 62 | 1.000 | 0.500 | 2.000 | [0 1 0] | [−1 0 −1] |
| 63 | 1.000 | 1.000 | 0.500 | [0 0 1] | [−1 −1 0] |
| 64 | 1.000 | 1.000 | 1.500 | [0 0 1] | [−1 −1 0] |
| 65 | 1.000 | 1.500 | 0.000 | [0 1 0] | [−1 0 −1] |
| 66 | 1.000 | 1.500 | 1.000 | [0 1 0] | [−1 0 −1] |
| 67 | 1.000 | 1.500 | 2.000 | [0 1 0] | [−1 0 −1] |
| 68 | 1.000 | 2.000 | 0.500 | [0 0 1] | [−1 −1 0] |
| 69 | 1.000 | 2.000 | 1.500 | [0 0 1] | [−1 −1 0] |
| 70 | 1.167 | 0.667 | 0.667 | [1 0 0] | [0 −1 −1] |
| 71 | 1.167 | 0.667 | 1.667 | [1 0 0] | [0 −1 −1] |
| 72 | 1.167 | 1.667 | 0.667 | [1 0 0] | [0 −1 −1] |
| 73 | 1.167 | 1.667 | 1.667 | [1 0 0] | [0 −1 −1] |
| 74 | 1.333 | −0.167 | 0.333 | [0 1 0] | [−1 0 −1] |
| 75 | 1.333 | −0.167 | 1.333 | [0 1 0] | [−1 0 −1] |
| 76 | 1.333 | 0.333 | −0.167 | [0 0 1] | [−1 −1 0] |
| 77 | 1.333 | 0.333 | 0.833 | [0 0 1] | [−1 −1 0] |
| 78 | 1.333 | 0.333 | 1.833 | [0 0 1] | [−1 −1 0] |
| 79 | 1.333 | 0.833 | 0.333 | [0 1 0] | [−1 0 −1] |
| 80 | 1.333 | 0.833 | 1.333 | [0 1 0] | [−1 0 −1] |
| 81 | 1.333 | 1.333 | −0.167 | [0 0 1] | [−1 −1 0] |
| 82 | 1.333 | 1.333 | 0.833 | [0 0 1] | [−1 −1 0] |
| 83 | 1.333 | 1.333 | 1.833 | [0 0 1] | [−1 −1 0] |
| 84 | 1.333 | 1.833 | 0.333 | [0 1 0] | [−1 0 −1] |
| 85 | 1.333 | 1.833 | 1.333 | [0 1 0] | [−1 0 −1] |
| 86 | 1.500 | 0.000 | 0.000 | [1 0 0] | [0 −1 −1] |
| 87 | 1.500 | 0.000 | 1.000 | [1 0 0] | [0 −1 −1] |
| 88 | 1.500 | 0.000 | 2.000 | [1 0 0] | [0 −1 −1] |
| 89 | 1.500 | 1.000 | 0.000 | [1 0 0] | [0 −1 −1] |
| 90 | 1.500 | 1.000 | 1.000 | [1 0 0] | [0 −1 −1] |
| 91 | 1.500 | 1.000 | 2.000 | [1 0 0] | [0 −1 −1] |
| 92 | 1.500 | 2.000 | 0.000 | [1 0 0] | [0 −1 −1] |
| 93 | 1.500 | 2.000 | 1.000 | [1 0 0] | [0 −1 −1] |
| 94 | 1.500 | 2.000 | 2.000 | [1 0 0] | [0 −1 −1] |
| 95 | 1.667 | 0.167 | 0.667 | [0 1 0] | [−1 0 −1] |
| 96 | 1.667 | 0.167 | 1.667 | [0 1 0] | [−1 0 −1] |
| 97 | 1.667 | 0.667 | 0.167 | [0 0 1] | [−1 −1 0] |
| 98 | 1.667 | 0.667 | 1.167 | [0 0 1] | [−1 −1 0] |
| 99 | 1.667 | 0.667 | 2.167 | [0 0 1] | [−1 −1 0] |
| 100 | 1.667 | 1.167 | 0.667 | [0 1 0] | [−1 0 −1] |
| 101 | 1.667 | 1.167 | 1.667 | [0 1 0] | [−1 0 −1] |
| 102 | 1.667 | 1.667 | 0.167 | [0 0 1] | [−1 −1 0] |
| 103 | 1.667 | 1.667 | 1.167 | [0 0 1] | [−1 −1 0] |
| 104 | 1.667 | 1.667 | 2.167 | [0 0 1] | [−1 −1 0] |
| 105 | 1.667 | 2.167 | 0.667 | [0 1 0] | [−1 0 −1] |
| 106 | 1.667 | 2.167 | 1.667 | [0 1 0] | [−1 0 −1] |
| 107 | 1.833 | 0.333 | 0.333 | [1 0 0] | [0 −1 −1] |
| 108 | 1.833 | 0.333 | 1.333 | [1 0 0] | [0 −1 −1] |
| 109 | 1.833 | 1.333 | 0.333 | [1 0 0] | [0 −1 −1] |
| 110 | 1.833 | 1.333 | 1.333 | [1 0 0] | [0 −1 −1] |
| 111 | 2.000 | 0.000 | 0.500 | [0 0 1] | [−1 −1 0] |
| 112 | 2.000 | 0.000 | 1.500 | [0 0 1] | [−1 −1 0] |
| 113 | 2.000 | 0.500 | 0.000 | [0 1 0] | [−1 0 −1] |
| 114 | 2.000 | 0.500 | 1.000 | [0 1 0] | [−1 0 −1] |
| 115 | 2.000 | 0.500 | 2.000 | [0 1 0] | [−1 0 −1] |
| 116 | 2.000 | 1.000 | 0.500 | [0 0 1] | [−1 −1 0] |
| 117 | 2.000 | 1.000 | 1.500 | [0 0 1] | [−1 −1 0] |
| 118 | 2.000 | 1.500 | 0.000 | [0 1 0] | [−1 0 −1] |
| 119 | 2.000 | 1.500 | 1.000 | [0 1 0] | [−1 0 −1] |
| 120 | 2.000 | 1.500 | 2.000 | [0 1 0] | [−1 0 −1] |
| 121 | 2.000 | 2.000 | 0.500 | [0 0 1] | [−1 −1 0] |
| 122 | 2.000 | 2.000 | 1.500 | [0 0 1] | [−1 −1 0] |
| 123 | 2.167 | 0.667 | 0.667 | [1 0 0] | [0 −1 −1] |
| 124 | 2.167 | 0.667 | 1.667 | [1 0 0] | [0 −1 −1] |
| 125 | 2.167 | 1.667 | 0.667 | [1 0 0] | [0 −1 −1] |
| 126 | 2.167 | 1.667 | 1.667 | [1 0 0] | [0 −1 −1] |

Table 3, below, reports the calculated volume percent, theoretical density, effective thermal conductivity along the x-axis, and effective thermal conductivity averaged over x, y, and z axes for Modeling Examples 1-21 and Comparative Examples A and B.

TABLE 3

| Modelling Example | Particle | Volume Percent | Theoretical Density (g/cm³) | Effective Thermal Conductivity, along x axis Wm⁻¹K⁻¹ | Effective Thermal Conductivity, average of 3 axes Wm⁻¹K⁻¹ |
|---|---|---|---|---|---|
| 1 | A | 12.5 | 1.37 | 0.367 | 0.271 |
| 2 | A | 25.3 | 1.75 | 0.579 | 0.397 |
| 3 | A | 53.7 | 2.58 | 1.332 | 0.911 |
| 4 | B | 10.0 | 1.30 | 0.362 | 0.261 |
| 5 | B | 20.2 | 1.60 | 0.571 | 0.372 |
| 6 | B | 42.8 | 2.26 | 1.306 | 0.769 |
| 7 | C | 8.7 | 1.26 | 0.353 | 0.255 |
| 8 | C | 17.6 | 1.52 | 0.553 | 0.360 |
| 9 | C | 37.2 | 2.10 | 1.250 | 0.729 |
| 10 | A | 10.2 | 1.30 | 0.262 | 0.262 |
| 11 | A | 16.1 | 1.48 | 0.335 | 0.335 |
| 12 | A | 24.3 | 1.72 | 0.469 | 0.469 |
| 13 | A | 35.1 | 2.04 | 0.881 | 0.881 |
| 14 | B | 8.2 | 1.24 | 0.252 | 0.252 |
| 15 | B | 12.9 | 1.38 | 0.316 | 0.316 |
| 16 | B | 19.4 | 1.57 | 0.430 | 0.430 |
| 17 | B | 28.0 | 1.83 | 0.793 | 0.793 |
| 18 | C | 7.1 | 1.21 | 0.245 | 0.245 |

TABLE 3-continued

| Modelling Example | Particle | Volume Percent | Theoretical Density (g/cm³) | Effective Thermal Conductivity, along x axis Wm⁻¹K⁻¹ | Effective Thermal Conductivity, average of 3 axes Wm⁻¹K⁻¹ |
|---|---|---|---|---|---|
| 19 | C | 11.2 | 1.33 | 0.303 | 0.303 |
| 20 | C | 16.9 | 1.50 | 0.405 | 0.405 |
| 21 | C | 24.3 | 1.72 | 0.708 | 0.708 |
| Comparative A | D | 16.1 | 1.48 | 0.300 | 0.300 |
| Comparative B | E | 11.2 | 1.33 | 0.253 | 0.253 |

Figure 13:
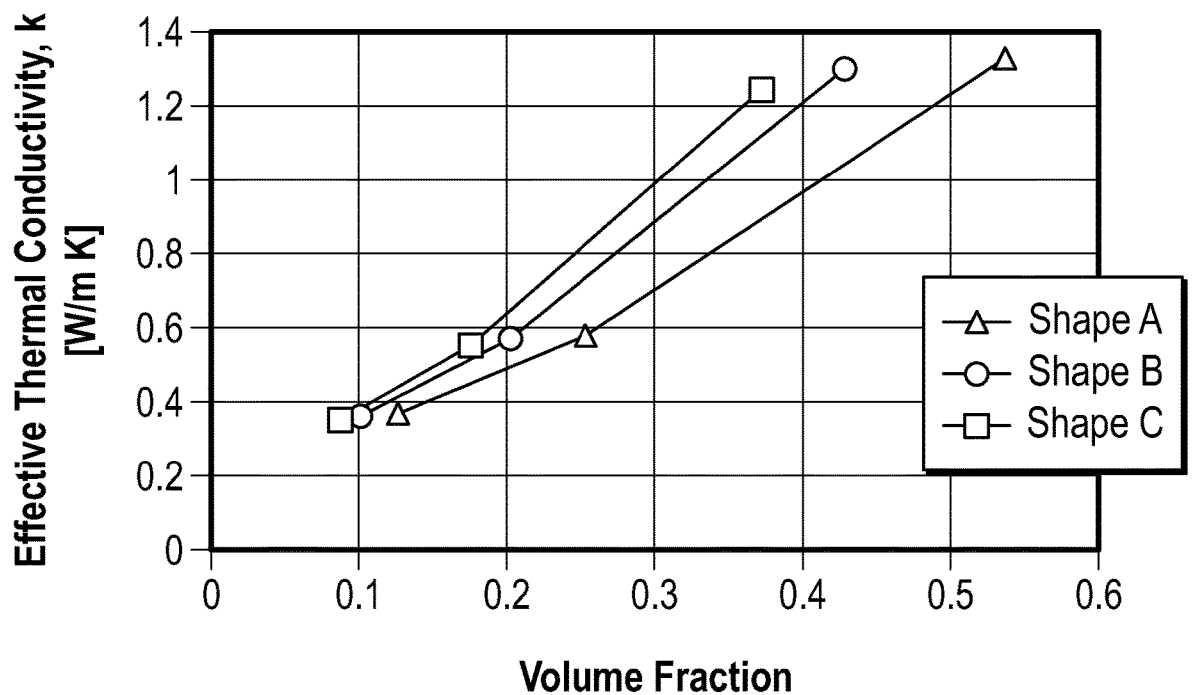
FIG. 13 is a plot of the effective thermal conductivity vs. volume fraction along the x-axis of composites comprising shapes A, B, and C in an oriented array.

FIG. 13 shows the effective thermal conductivity along the x-axis of composites comprising Shapes A, B, and C in an oriented array. The volume fraction of particles required to obtain comparable effective thermal conductivities in composites comprising Shape C is lower than that required for composites comprising Shape B, which is still lower than that required for composites comprising shape A. Given that the materials used to construct particles with Shapes A, B, and C and that the volume surrounding the particles is the same for all composites, this difference results in densities that are lowest for composites comprising Shape C and highest for those comprising Shape A while obtaining comparable thermal conductivity.

Figure 14:
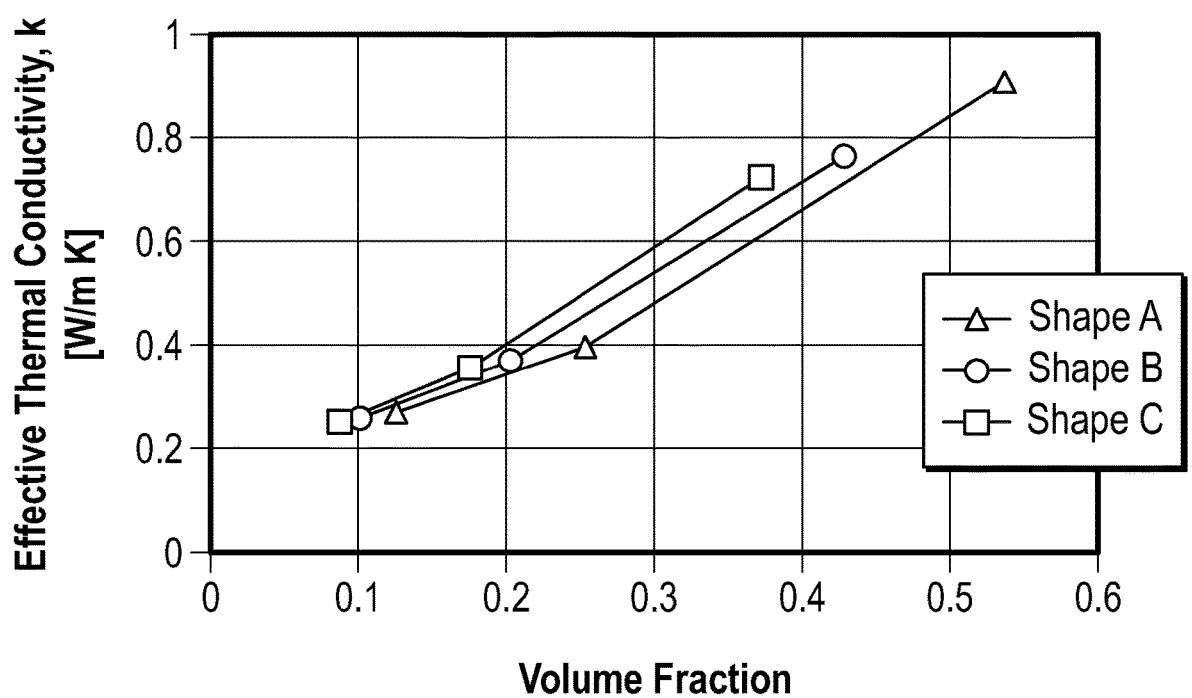
FIG. 14 is a plot of the effective thermal conductivity vs. volume fraction averaged over the x, y, and z-axes of composites comprising shapes A, B, and C in an oriented array.

FIG. 14 shows the effective thermal conductivity as an average of three orthogonal axes (x, y, and z) for composites comprising Shapes A, B, and C in an oriented array. The volume fraction of particles required to obtain comparable effective thermal conductivities in composites comprising Shape C is lower than that required for composites comprising Shape B, which is still lower than that required for composites comprising Shape A.

Figure 15:
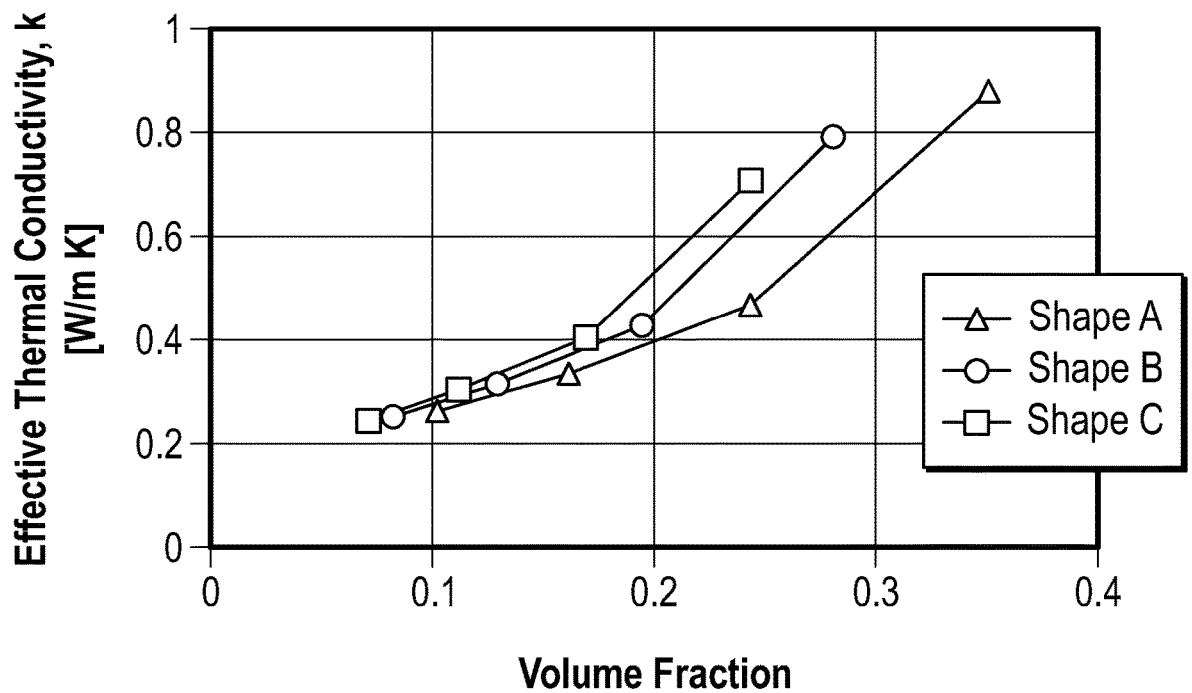
FIG. 15 shows the effective thermal conductivity as an average along three orthogonal axes (x, y, and z) for composites comprising shapes A, B, and C in an array comprising particles equally oriented along one of the x, v, and z axes.

FIG. 15 shows the effective thermal conductivity as an average along three orthogonal axes (x, y, and z) for composites comprising Shapes A, B, and C in an array comprising particles equally oriented along x, y, and z axes as reported in Table 2.

Figure 8:
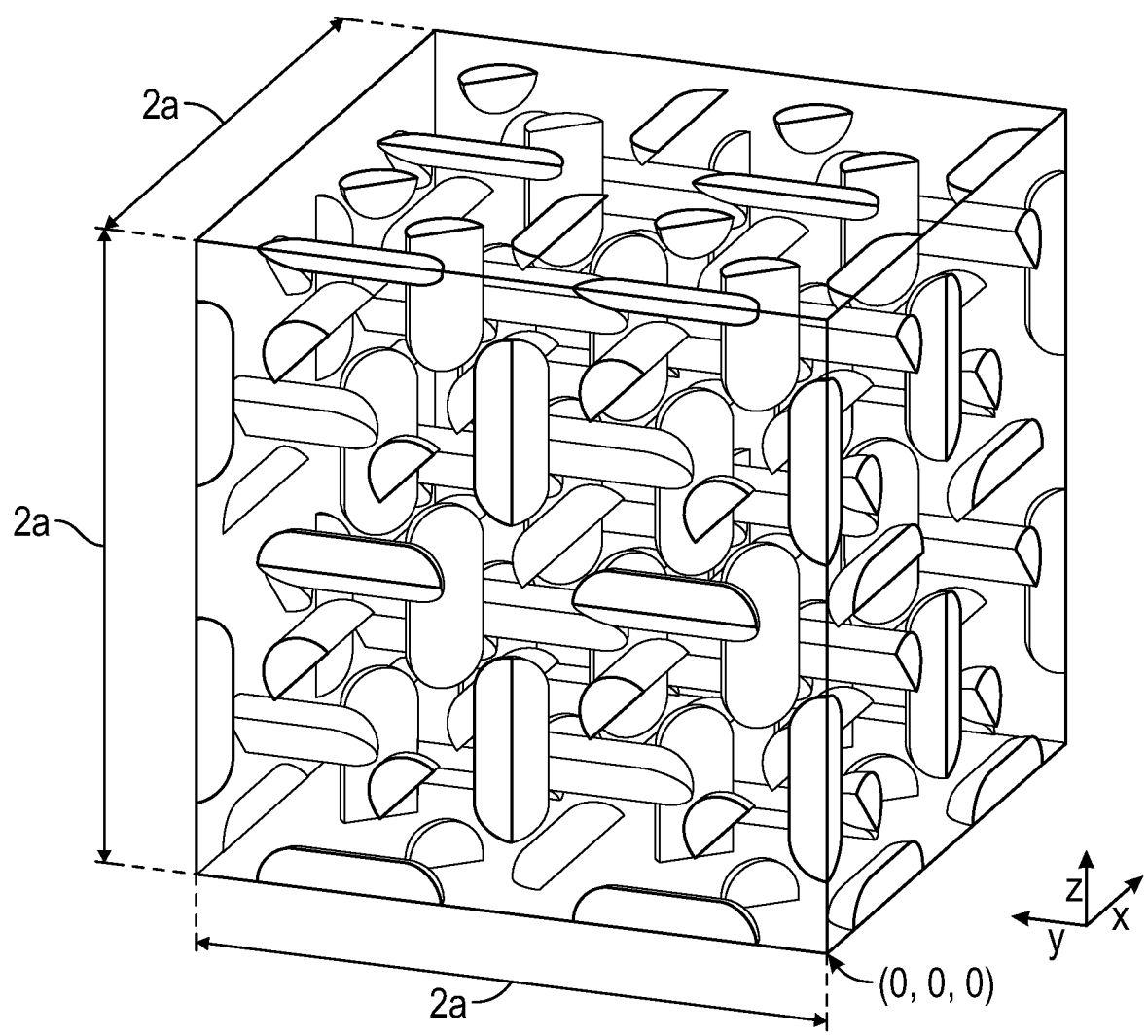
FIG. 8 is a perspective view of Modeling Example 10 featuring shaped thermal filler particle 100.
Figure 9:
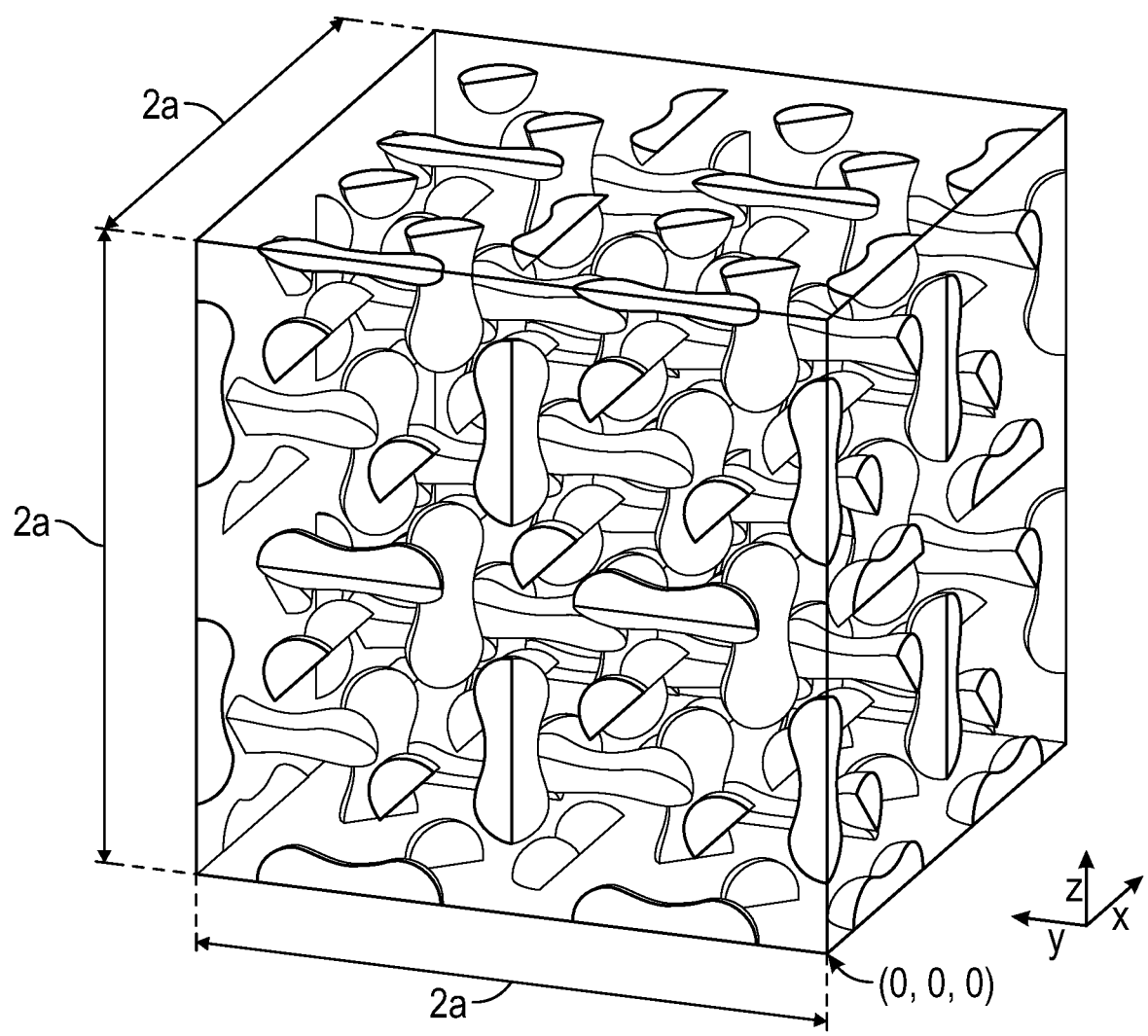
FIG. 9 is a perspective view of Modeling Example 14 featuring shaped thermal filler particle 200.
Figure 10:
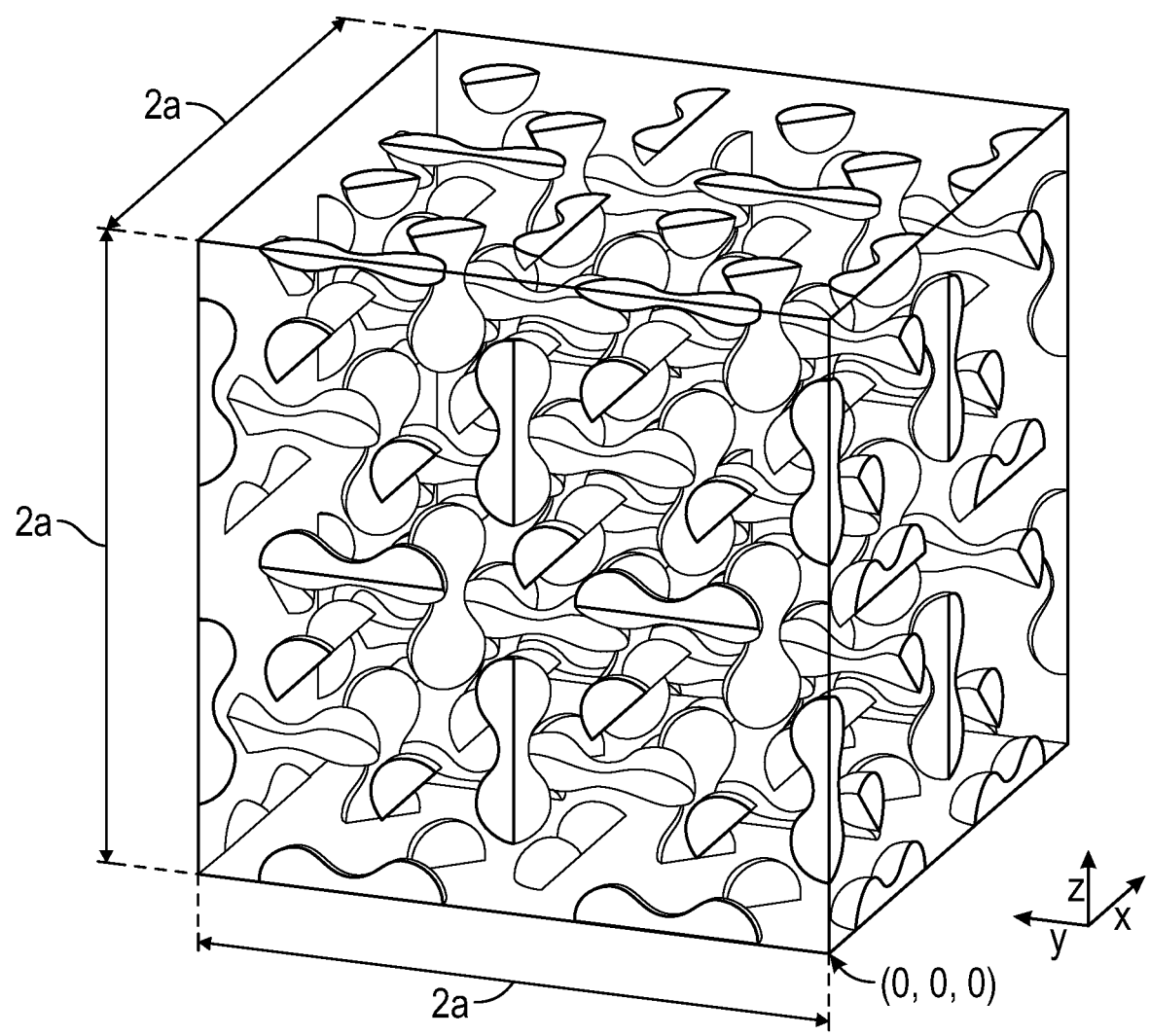
FIG. 10 is a perspective view of Modeling Example 18 featuring shaped thermal filler particle
Figure 11:
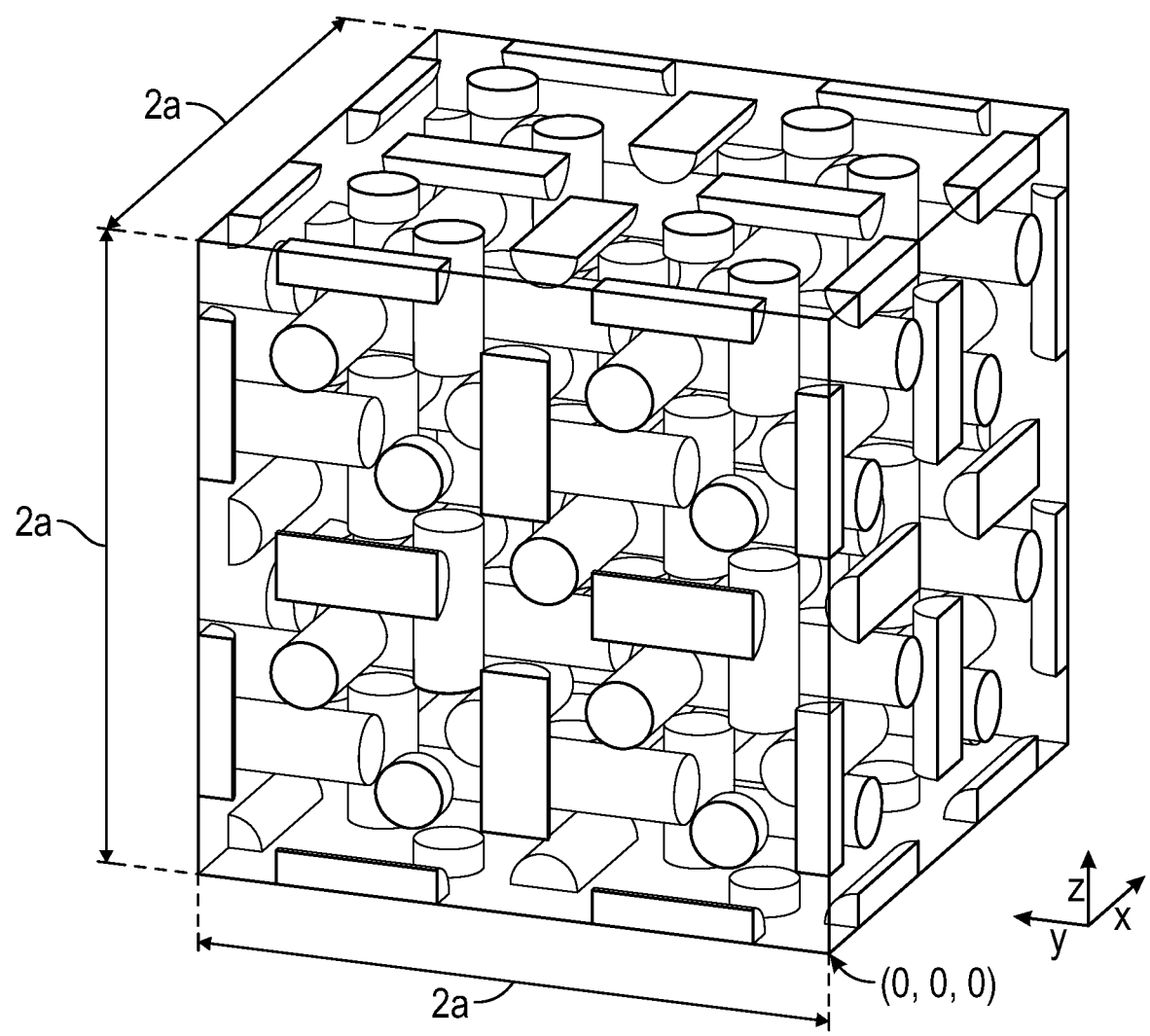
FIG. 11 is a perspective view of Comparative Modeling Example A featuring comparative example particle 400.
Figure 12:
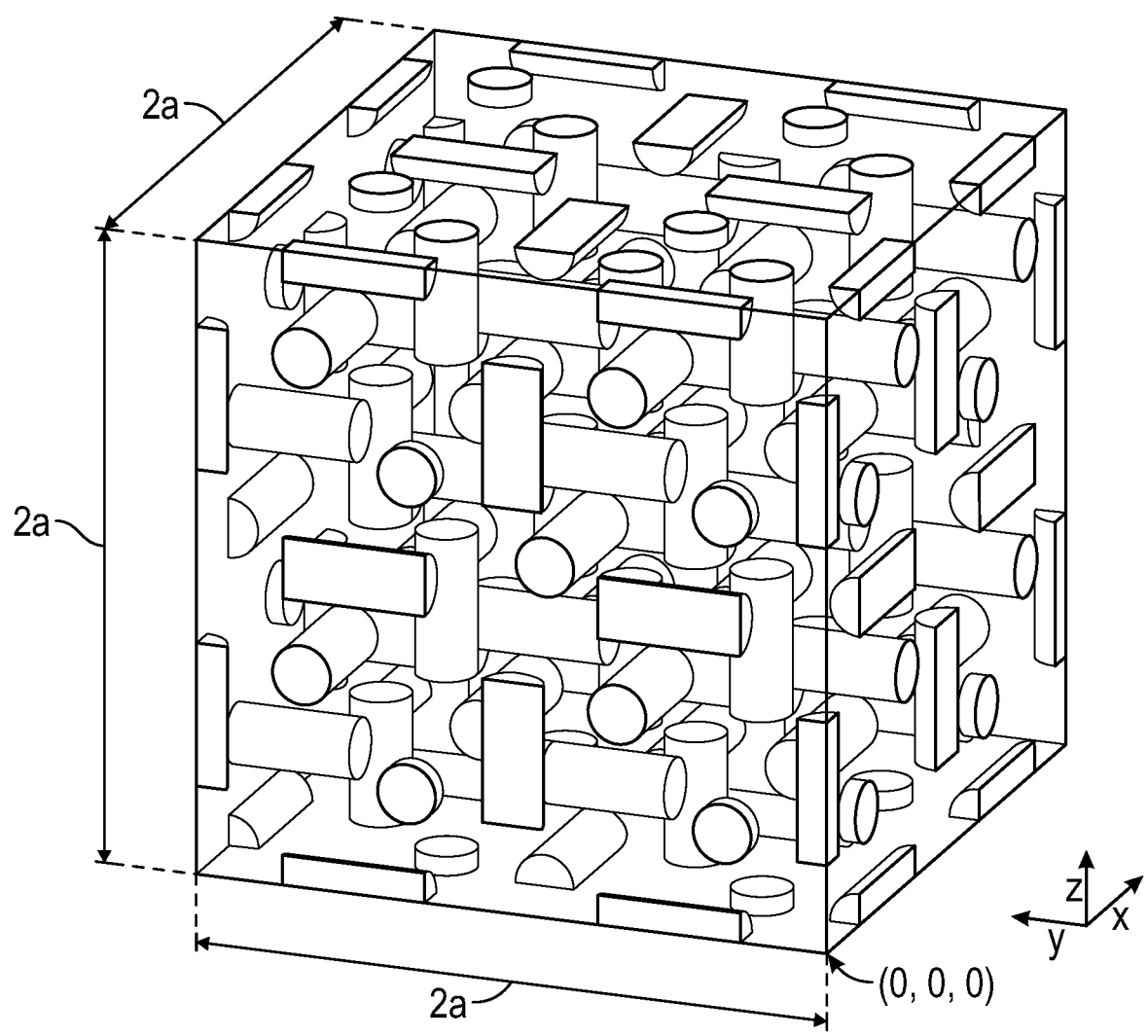
FIG. 12 is a perspective view of Comparative Modeling Example B featuring comparative example particle 400.

A representative arrangement of this specific array for Shape A, B, or C is presented in FIG. 8, 9, or 10, respectively. Note that because the overall orientation of particles in the array is not biased in any of the three principal directions, the effective thermal conductivity is identical when measured along any of the three pairs of opposing faces of the bounding box. The volume fraction of particles required to obtain comparable effective thermal conductivities in composites comprising Shape C is lower than that required for composites comprising Shape B, which is still lower than that required for composites comprising Shape A.

Figure 16:
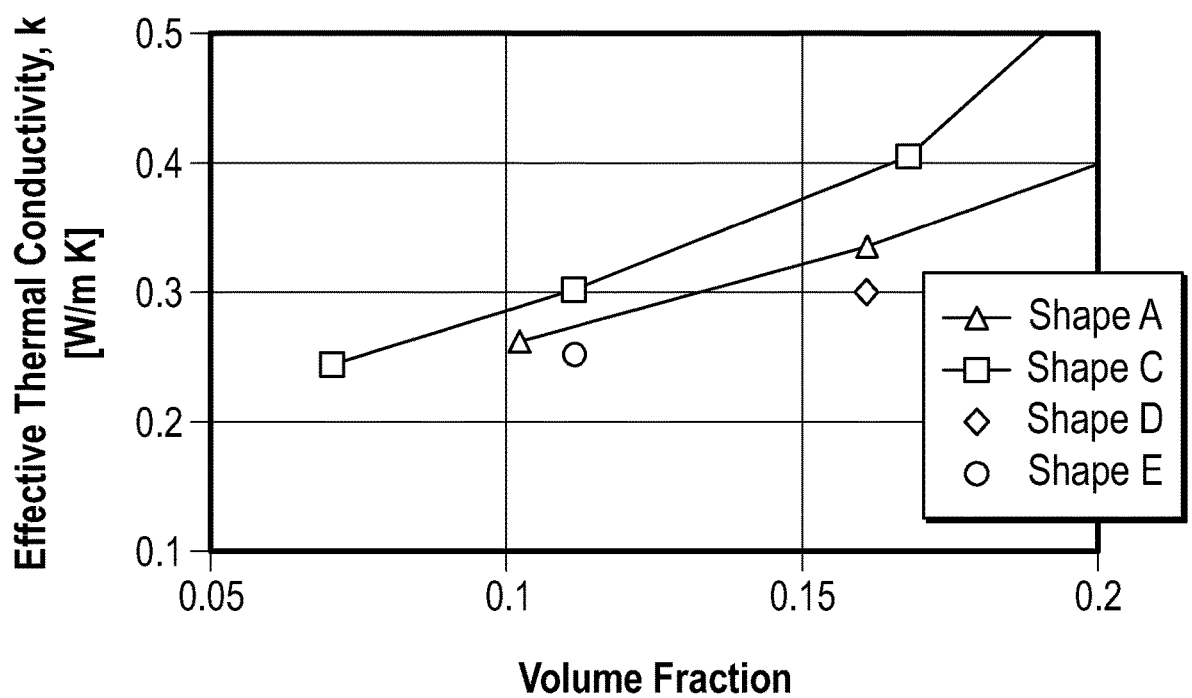
FIG. 16 shows the effective thermal conductivity as an average along three orthogonal axes (x, v, and z) for composites comprising shapes A, C, D, and E in an array comprising particles equally oriented along one of the x, y, and z axes.

FIG. 16 shows the effective thermal conductivity as an average along three orthogonal axes (x, y, and z) for composites comprising Shapes A, C, D, and E in an array comprising particles equally oriented along one of the x, y, and z axes. A representative arrangement of this specific array for Shape A, C, D, or E is presented in FIG. 8, 10, 11, or 12, respectively. Note that the aspect ratio for Shapes D and E are identical to those of Shapes A and C, respectively. From this, composites comprising the particles of shape described by this disclosure (Shapes A and C) have a higher effective thermal conductivity at a given volume fraction than comparative Shapes D and E.

Working Example 1

Shaped alumina particles were produced from an aqueous suspension of alumina in water with binder and dispersant using components and amounts reported in Table 4, below.

TABLE 4

| ABBREVIATION | SOURCE | AMOUNT, grams |
|---|---|---|
| Water | | 196.17 |
| Alumina | Aluminum (III) Oxide available from Almatis Inc., Bauxite, Arkansas as RG4000 | 588.52 |
| Sodium Polymethacrylate Solution | Sodium Polymethacrylate Solution obtained from Geo Specialty Chemicals, Ambler, Pennsylvania, as DAXAD 30 | 11.77 |
| Cell gum | Sodium carboxymethylcellulose, obtained from Ashland, Columbus, Ohio, as BLANOSE REF CMC 7ULC | 5.89 |

Shaped alumina particles were produced by making an aqueous suspension of alumina in water with binder and dispersant.

Figure 18:
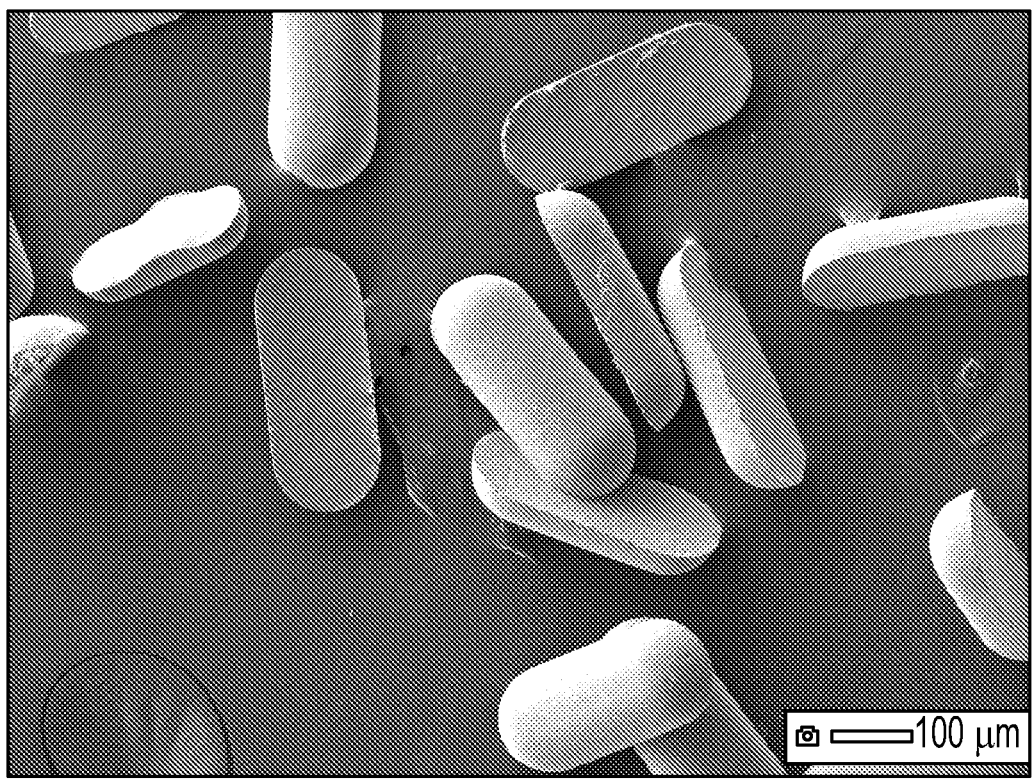
FIG. 18 is a scanning electron micrograph of shaped thermal filler particles made in Working Example 1.

The cell gum was added to the water very slowly first and fully dissolved with aggressive high shear mixing. The sodium polymethacrylate solution was added before the alumina was added last. After high shear mixing for 30 minutes the mixture was transferred to a 1.8 L ball mill (obtained as ROALAX from U.S. Stoneware, East Palestine, Ohio,) with 1 cm cylindrical alumina media (obtained as BURUNDUM from U.S. Stoneware) half filling the jar for 24 hours at 175 revolutions per minute to make a homogeneous suspension. Molded precursor green particles were made from the suspension generally as described in U.S. Pat. No. 8,701,441 (Kramlich, et. al.), incorporated herein by reference. The mold used had the dimensions defined for Shape A in Table 1. FIG. 18 shows the resulting molded precursor particles The molded precursor particles were placed in an alumina combustion boat (obtained as AL-5020 from AdValue Technology, Tucson, Arizona) and the boat with particles was put into a rapid fire furnace (obtained as 1708 BL from CM Furnaces, Inc., Bloomfield, New Jersey). The furnace temperature was increased at 10 degrees Celsius (° C.) per minute to a set point of 1400° ° C. where the temperature was held for 6 hours before decreasing to room temperature at 10° C. per minute.

Working Example 2

Figure 19:
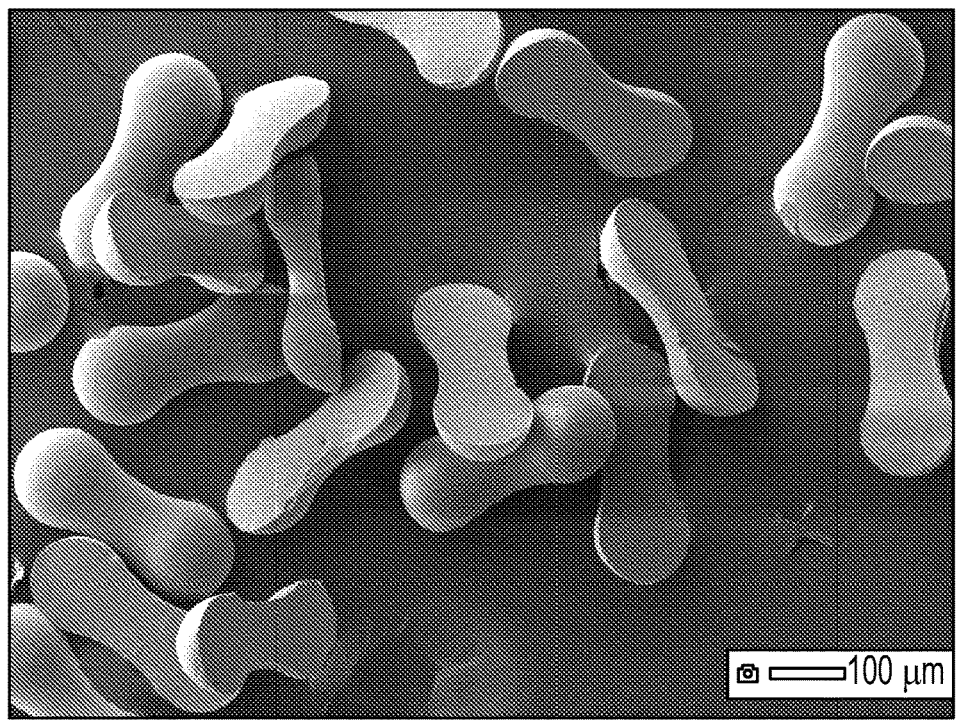
FIG. 19 is a scanning electron micrograph of shaped thermal filler particles made in Working Example 2.

Shaped thermal filler particles were prepared as in Working Example 1, except that Shape B was used instead of Shape A. FIG. 19 shows the resulting molded precursor particles.

Working Example 3

Figure 20:
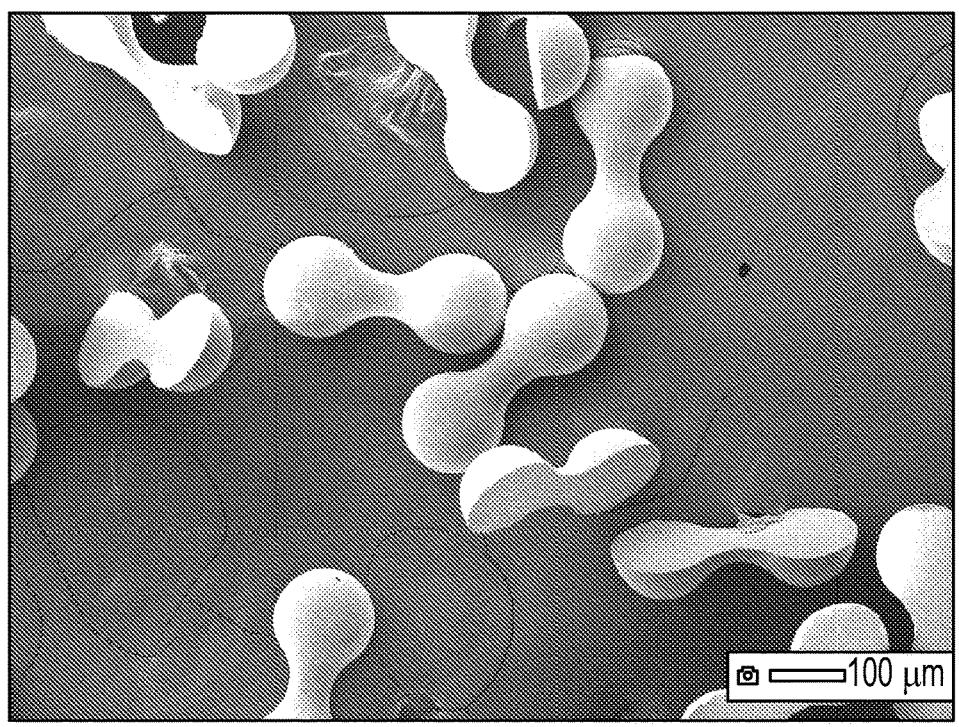
FIG. 20 is a scanning electron micrograph of shaped thermal filler particle made in Working Example 3.

Shaped thermal filler particles were prepared as in Working Example 1, except that Shape C was used instead of Shape A. FIG. 20 shows the resulting molded precursor particles.

The preceding description, given in order to enable one of ordinary skill in the art to practice the claimed disclosure, is not to be construed as limiting the scope of the disclosure, which is defined by the claims and all equivalents thereto. In the event of inconsistencies or contradictions between portions of the incorporated references and this application, the information in this application shall control.

What is claimed is:

1. A shaped thermal filler particle having an elongate shape defined by a planar first smooth surface, a second smooth surface that contacts the planar first smooth surface along a closed path, wherein at least a portion of the second smooth surface is convex, wherein the closed path has a length to width ratio of at least 1.5 and wherein the shaped thermal filler particle has a maximum linear dimension normal to the planar first smooth surface that is less than one half of the length of the closed path and the shaped thermal filler particle has a thermal conductivity of at least 2 $Wm^{-1}K^{-1}$.

2. The shaped thermal filler particle of claim 1, wherein the closed path has two rounded ends and a relatively narrower waist disposed therebetween.

3. The shaped thermal filler particle of claim 1, wherein the closed path has two semicircular ends connected by two parallel line segments.

4. The shaped thermal filler particle of claim 1, wherein the second smooth surface is completely convex.

5. The shaped thermal filler particle of claim 1, wherein the shaped thermal filler particle comprises at least one of aluminum oxide, magnesium oxide, aluminum hydroxide, zinc oxide, boron nitride, or aluminum nitride.

6. The shaped thermal filler particle of claim 1, wherein the shaped thermal filler particle is inorganic.

7. The shaped thermal filler particle of claim 6, wherein the shaped thermal filler particle is ceramic.

8. The shaped thermal filler particle of claim 1, wherein the shaped thermal filler particle has a homogenous composition.

9. A thermally conductive composition comprising from 1 to 95 percent by volume of shaped thermal filler particles according to claim 1 dispersed in an organic binder.

10. The thermally conductive composition of claim 9, wherein the thermally conductive composition is hardened.

11. The thermally conductive composition of claim 9, wherein the thermally conductive composition is chemically crosslinked.

12. The thermally conductive composition of claim 9, wherein the thermally conductive composition comprises a grease.

13. The thermally conductive composition of claim 9, further comprising secondary thermally conductive particles.

14. The thermally conductive composition of claim 9, wherein the thermally conductive composition has a thermal conductivity of at least 1 Wm-1K-1.

15. The thermally conductive composition of claim 9, wherein the shaped thermally conductive particles are randomly oriented.

16. An assembly comprising:
    a heat source;
    a heat sink; and
    the thermally conductive composition of claim 10 at least partially sandwiched between the heat source and the heat sink.

* * * * *